US006823094B2

(12) United States Patent
Goh et al.

(10) Patent No.: US 6,823,094 B2
(45) Date of Patent: Nov. 23, 2004

(54) INTERFEROMETER AND ITS FABRICATION METHOD

(75) Inventors: Takashi Goh, Mito (JP); Makoto Abe, Mito (JP); Yasuyuki Inoue, Mito (JP); Masayuki Okuno, Hitachinaka (JP); Takashi Saida, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 370 days.

(21) Appl. No.: 10/054,618

(22) Filed: Jan. 22, 2002

(65) Prior Publication Data

US 2002/0126933 A1 Sep. 12, 2002

(30) Foreign Application Priority Data

Jan. 26, 2001 (JP) ........................................ 2001-017943

(51) Int. Cl.[7] .............................. G02B 6/12; G02B 6/10; G02B 6/26

(52) U.S. Cl. .............................. 385/14; 385/41; 385/42; 385/130

(58) Field of Search ........................ 385/14, 39, 41–42, 385/129–131; 365/345, 350

(56) References Cited

U.S. PATENT DOCUMENTS

| 4,781,424 A | | 11/1988 | Kawachi et al. | |
| 5,119,447 A | | 6/1992 | Trisno | |
| 5,157,744 A | | 10/1992 | Korotky | |
| 5,359,449 A | | 10/1994 | Nishimoto et al. | |
| 5,506,925 A | | 4/1996 | Greene et al. | |
| 6,084,050 A | * | 7/2000 | Ooba et al. | 528/42 |
| 6,240,221 B1 | | 5/2001 | Thompson | |
| 6,356,681 B1 | * | 3/2002 | Chen et al. | 385/37 |
| 6,546,161 B2 | * | 4/2003 | Okuno et al. | 385/14 |

FOREIGN PATENT DOCUMENTS

| EP | 0297851 A2 | 1/1989 |
| EP | 1058136 | 12/2000 |
| EP | 1065534 | 1/2001 |
| JP | 63-182608 | 7/1988 |
| JP | 0297851 A3 | 1/1989 |
| JP | 64-077002 | 3/1989 |
| JP | 02-130503 | 5/1990 |
| JP | 03-067204 | 3/1991 |
| JP | 03-267902 | 11/1991 |

(List continued on next page.)

OTHER PUBLICATIONS

Abe M, Inoue Y, Moriwaki K, Okuno M, Ohmori Y. Optical path length trimming technique using thin film heaters for silica–based waveguides on Si. Electronic Letters 1996; 32(19):1818–1819.

(List continued on next page.)

Primary Examiner—John D Lee
Assistant Examiner—Tina M Lin
(74) Attorney, Agent, or Firm—Fitch, Even, Tabin & Flannery

(57) ABSTRACT

An interferometer includes a waveguide core, and thin film heaters with widths W1 and W2. The thin film heaters are mounted directly above the waveguide core, and operate as two types of different annealing regions. The annealing, which is carried out by supplying current to the thin film heaters, can alter the quality of the cladding, and change the stress applied on the waveguide core, thereby making it possible to control the polarization dependency. Thus changing the width of the thin film heaters and/or the amount of the supply current thereto enables the permanent control of the effective refractive index (birefringence index) independently in the transverse electric polarization mode and the transverse magnetic polarization mode. This enables the transverse electric polarization mode to be adjusted to a phase difference of $\lambda/2$, and the transverse magnetic polarization mode to a phase difference of zero.

20 Claims, 17 Drawing Sheets

FOREIGN PATENT DOCUMENTS

| | | |
|---|---|---|
| JP | 04-113302 | 4/1992 |
| JP | 04-337707 | 11/1992 |
| JP | 05-061077 | 3/1993 |
| JP | 05-142504 | 6/1993 |
| JP | 07-333446 | 12/1995 |
| JP | 10-246828 | 9/1998 |
| JP | 2001-100163 | 4/2001 |
| JP | 2001-154053 | 6/2001 |
| WO | WO 0048024 | 8/2000 |

OTHER PUBLICATIONS

Moriwaki K, Abe M, Inoue Y, Okuno M, Ohmori Y. New silica–based 8 × 8 thermo–optic matrix switch on Si that requires no bias power. OFC Technical Digest 1995; Feb. 26–Mar.3: 211–212.

Okuno M, Sugita A, Jinguji K, Kawachi M. Birefringence Control of Silica Waveguides on Si and Its Application to a Polarization–Bean Splitter/Switch. J Lightwave Tech 1994; 12(4):22–29.

International Search Report issued by the European Patent Office on Apr. 11, 2003.

J. Canning et al; Birefingence compensation, improved fringe contrast and trimming in an integrated asymmetric Mach–Zehnder interferometer using mid–IR laser processing vol. 14, No. 2; May 2000.

* cited by examiner

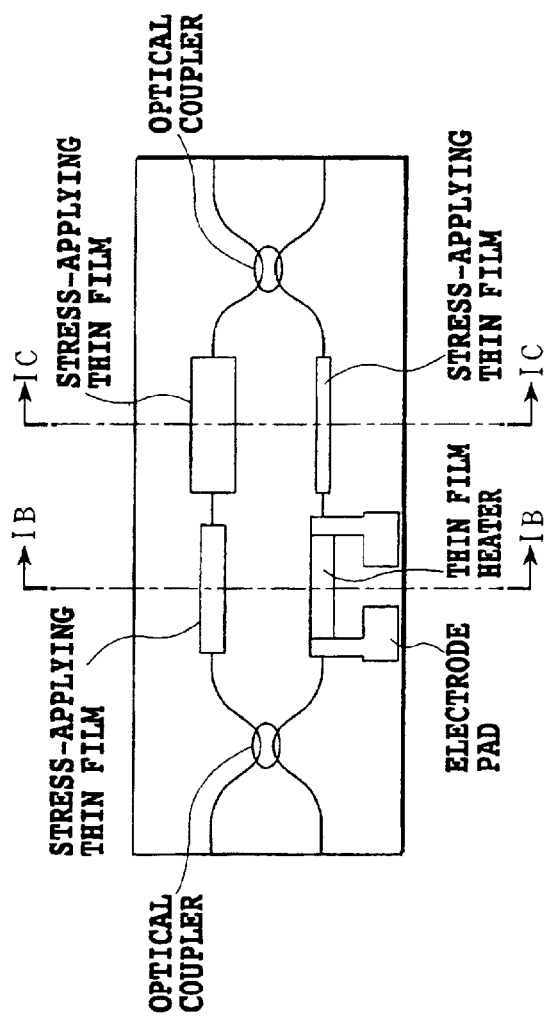
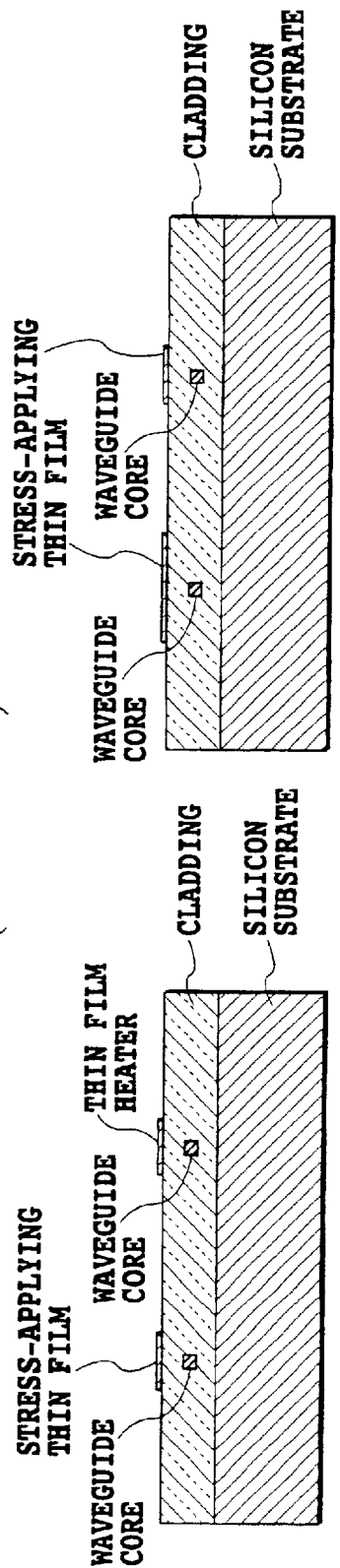
FIG. 1A (PRIOR ART)
FIG. 1B (PRIOR ART)
FIG. 1C (PRIOR ART)

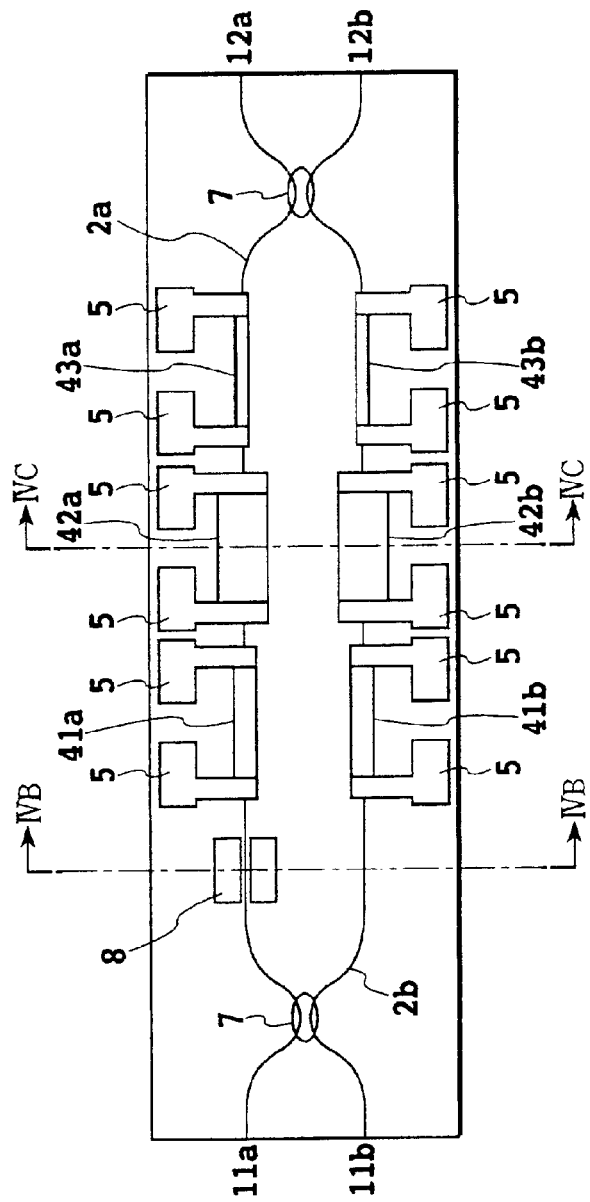
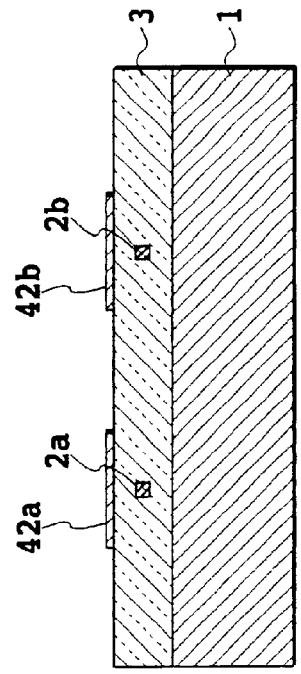
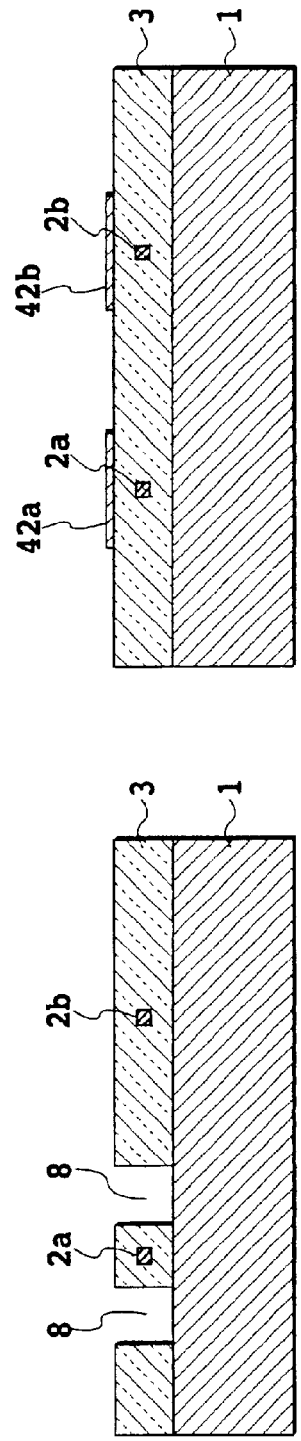
FIG.4A
FIG.4B
FIG.4C

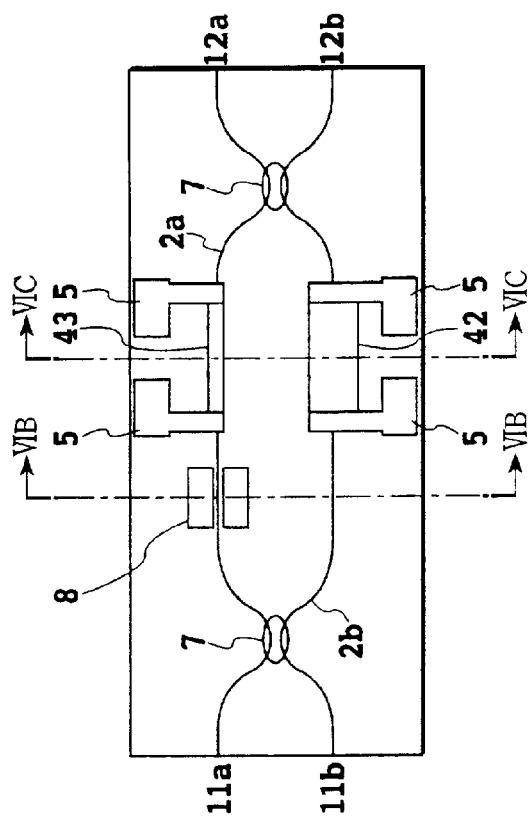
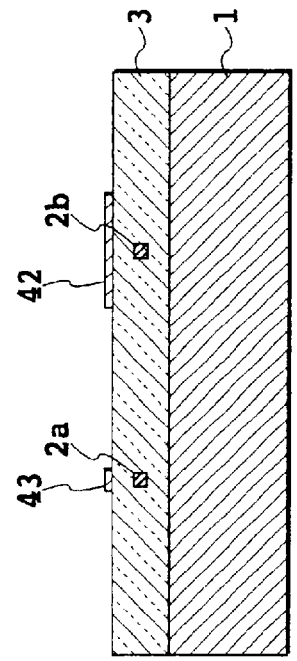
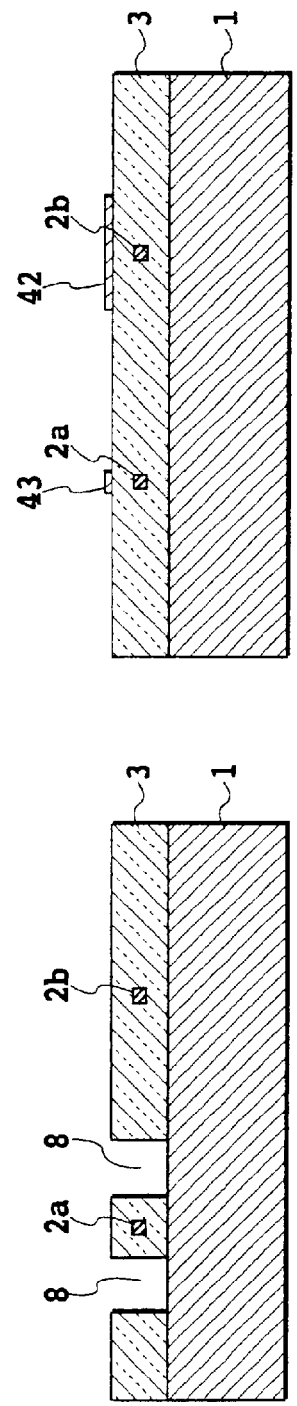
FIG.6A
FIG.6B
FIG.6C

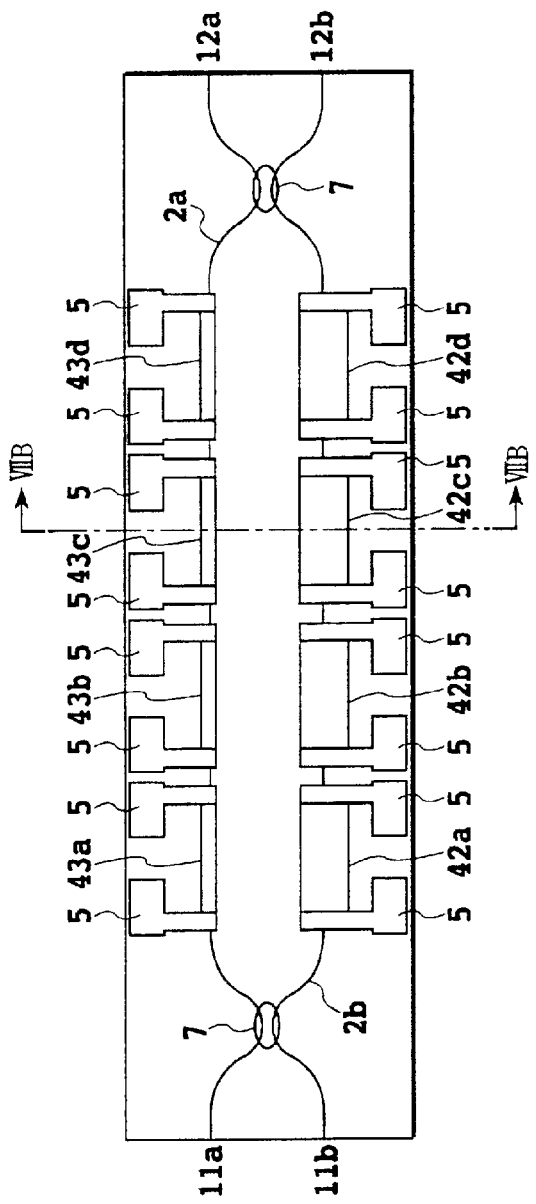
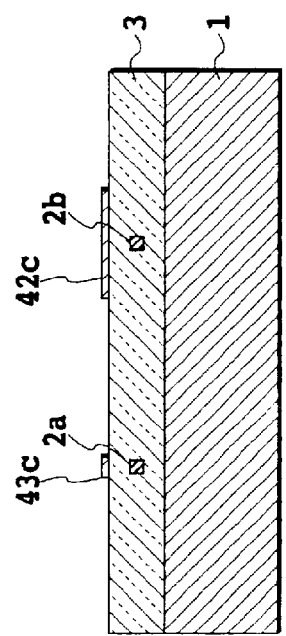
FIG.7A
FIG.7B

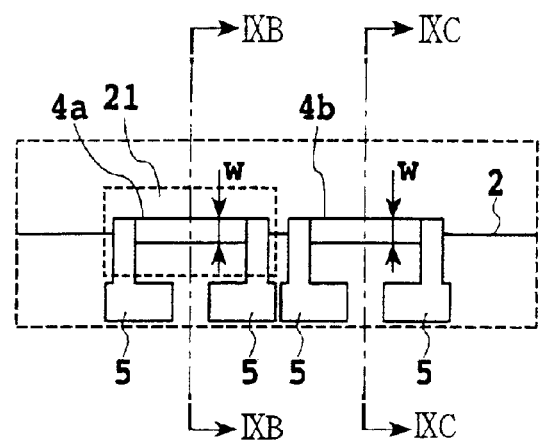
FIG.9A
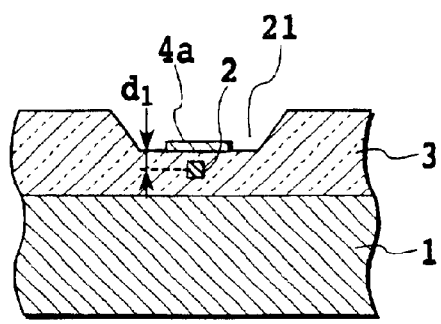 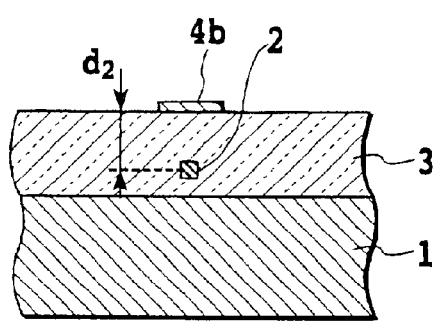
FIG.9B          FIG.9C

INTERFEROMETER AND ITS FABRICATION METHOD

This application is based on Patent Application No. 2001-017943 filed Jan. 26, 2001 in Japan, the content of which is incorporated hereinto by reference.

BACKGROUND OF THE INVENTION

1. Field of the Invention

The present invention relates to an interferometer and its fabrication method, which enable planar optical waveguide circuits used in optical communication field to adjust optical path lengths (phases) independently in the transverse electric (TE)polarization mode and transverse magnetic (TM) polarization mode.

2. Description of the Related Art

Optical circuits employing single mode waveguides formed on a substrate are characterized by high integration and mass productivity, and hence they are essential to construct economical optical network nodes. In particular, optical circuits utilizing silica-based waveguides with $SiO_2$ as the main ingredient has favorable characteristics such as low loss, superiority in an affinity for silica-based optical fibers, and long-term stability. Thus, a large variety of optical components typified by arrayed waveguide gratings are put to practical use, and are applied to commercial systems.

These optical components are fabricated by combining a glass film deposition technique such as flame hydrolysis deposition (FHD) and chemical vapor deposition (CVD) with a microfabrication technique such as reactive ion etching (RIE). More specifically, a glass film is deposited on a substrate such as a silicon wafer to form an lower-cladding, followed by depositing a core layer with a refractive index higher than that of the cladding layer. Then, a core pattern is formed by the microfabrication technique to form an optical circuit, followed by depositing a glass film to form an over-cladding layer, thereby fabricating an optical circuit composed of embedded waveguides.

Usually, the FHD carries out annealing with high temperature to consolidate a glass film, and the CVD also performs annealing to increase the transparency of a glass film. The high temperature process causes thermal stress in the glass film constituting the waveguides, resulting in waveguide birefringence (B-value) in which the effective refractive index of the waveguide varies depending on the polarization state, thereby bringing about optical polarization dependency in the circuit characteristics. In addition, since the waveguide birefringence differs slightly in a wafer surface because of fabrication error, it is necessary to trim the waveguide birefringence locally for each optical circuit to achieve satisfactory optical circuit characteristics.

As a conventional local waveguide birefringence trimming technique, a method is proposed that utilizes a stress-applying film consisting of an amorphous silicon thin film (Japanese Patent Application Laying-open No. 1-77002 (1989). It exploits a phenomenon that an amorphous silicon thin film, which is placed on a waveguide, causes a strong tensile stress in the waveguide, thereby varying the effective refractive index of the waveguide through the photoelastic effect of the glass. Varying the profile of the amorphous silicon thin film enables the control of the stress distribution, that is, the waveguide birefringence. Besides, since the amorphous silicon thin film can be removed by an Ar laser or the like, fine trimming of the length of the amorphous silicon thin film in accordance with the optical circuit characteristics enables the effective refractive index of the waveguide to be adjusted including the waveguide birefringence.

The technique using the amorphous silicon stress-applying film is more actively applied to a constituent element of a polarization beam splitter (PBS) (for example, see, "Birefringence control of silica waveguides on Si and its application to a polarization-beam splitter/switch", Journal of Lightwave Technology, Vol. 12, No. 4, Apr. 1994).

The PBS comprises a Mach-Zehnder interferometer (MZI), which includes two 3 dB optical couplers (50% optical couplers) consisting of silica-based waveguides and two waveguide arms formed on a substrate (silicon substrate), and on which three types of amorphous silicon stress-applying films with different width are placed.

One of the three types of the amorphous silicon stress-applying films with different width is 50 $\mu$m wide, and is provided to control the waveguide birefringence principally. The remaining two types are 90 $\mu$m and 100 $\mu$m wide, and are basically provided to control the effective refractive index of the waveguide polarization independently. The length of the amorphous silicon stress-applying film is trimmed by removing its part by an Ar laser, so that the optical path length difference between the two waveguide arms becomes zero for the transverse magnetic polarization mode, and $\lambda/2$ for the transverse electric polarization mode, where $\lambda$ is the wavelength. Thus, according to a known interference principle, the transverse magnetic polarization mode of the light entering the input port is guided to the cross port, whereas the transverse electric polarization mode is guided to the bar port. Thus, the MZI functions as a PBS.

The waveguide birefringence trimming technique utilizing the amorphous silicon stress-applying film, however, has a problem of complicating the device configuration and increasing its cost because of the final trimming using a laser and of the need for aligning the position of the laser irradiation at an accuracy of a few tens of micrometers.

On the other hand, a local-heat trimming method (see, Japanese Patent Application Laying-open No. 3-267902 (1991), for example) is put into practice as a method of trimming the effective refractive index of a waveguide. This technique changes the effective refractive index of the waveguide permanently by annealing the waveguide at rather high power by using thin film heaters patterned on the waveguide, thereby trimming the optical path length (phase) of the optical circuit. Since the thin film heaters are formed by the microfabrication technique using a photomask, it is enough to flow current through the thin film heaters without the high accuracy alignment at the annealing. Thus, the trimming is carried out by a rather simple equipment, enabling its automatization rather easily. This method, however, is insufficient as a method of controlling the waveguide birefringence because the principle of the effective refractive index change and the control of the polarization dependency still remain to be elucidated.

SUMMARY OF THE INVENTION

The inventors of the present invention have pursued intensive research to find that the principle of the foregoing local-heat trimming method is that it mainly changes the quality of the cladding between the heaters and the core by the local annealing (heating), and particularly the cladding immediately under the heaters (in other words, the glass quality near the top surface of the cladding), thereby causing a stress to be applied on the waveguide. Then, we demonstrated experimentally that the polarization dependency was controllable substantially by changing the stress distribution by adjusting the width w of the local annealing (heating) region. More specifically, we found that when the width of the local annealing region was 1.4–2.6 times the distance d from the top surface of the over-cladding to the core center, that is, in a range of ±30% of $w_o$, where $w_o$ was twice that distance d, the effective refractive index changed almost polarization independently, and that a local annealing region wider than $w_o$ made the transverse magnetic polarization mode more dominant in the refractive index change, whereas a local annealing region narrower than $w_o$ made the transverse electric polarization mode more dominant.

Thus, making the width of the local annealing region wider or narrower than $w_o$, twice the distance from the top surface of the over-cladding to the core center, enables the permanent effective refractive index control of the optical waveguide with retaining the polarization dependency. In particular, the local annealing using at least two types of widths makes it possible to achieve the permanent effective refractive index control, that is, birefringence index control with ensuring the complete independence between the transverse electric polarization mode and transverse magnetic polarization mode.

Since the polarization dependency of the effective refractive index is determined by the stress distribution caused by the local annealing, using at least two types of local annealing with different stress distribution principally enables the permanent effective refractive index control or the birefringence index control with securing the complete independence between the transverse electric polarization mode and the transverse magnetic polarization mode. Accordingly, similar effect can be produced by utilizing the difference, for example, in the distance between the local annealing region and the waveguide center, or in the structure such as geometry of the local annealing region in addition to the width of the local annealing region. Furthermore, the stress geometry can be changed by forming a trench by removing part of the cladding near the local annealing region, and by changing its position, depth, etc.

Since the optical path length trimming by the local annealing is only for the purpose of fine adjustment, when a delay difference (optical path length difference) is required in the circuit design, it is preferable to provide a fixed delay optical circuit in advance, and to carry out the trimming in the final stage to improve the characteristics.

As for the annealing means, although a method using the thin film heater is preferable considering the device cost, this is not essential. Any means that can perform the local annealing of the cladding are applicable. For example, a local annealing (heating) means such as a $CO_2$ laser can be utilized.

In summary, the present invention is based on the following new findings. That is, the local annealing can permanently change the refractive index of the optical waveguide consisting of a core and a cladding because it can cause a stress to be applied on the core because of the changes in the quality in the heated portions. Therefore, changing the width of the region to be transformed by annealing (heating), or the distance or position thereof with respect to the waveguide can make the refractive index of the transverse electric polarization mode greater than, or smaller than, or equal to that of the transverse magnetic polarization mode.

According to the findings above, the interferometer and its fabrication method in accordance with the present invention are characterized in that the refractive index or the optical path length is adjusted by annealing the waveguide with at least two types of annealing regions having effect on the polarization.

For example, employing a combination of a first annealing region, which changes the refractive index of the transverse electric polarization mode more dominantly than that of the transverse magnetic polarization mode, and a second annealing region, which equally changes the refractive index of the transverse electric polarization mode and that of the transverse magnetic polarization mode, enables the phase difference of the transverse electric polarization mode to be adjusted to $\lambda/2$ and that of the transverse magnetic polarization mode to zero in a single interferometer, by establishing the optical path length difference between the transverse electric polarization mode and the transverse magnetic polarization mode at a desired value ($\lambda/2$, for example) by the first annealing region, and then by shifting the optical path length difference of the two polarization modes by the same amount.

On the basis of the foregoing findings, according to a first aspect of the present invention, there is provided an interferometer using an optical waveguide, which is formed by embedding a core that has a refractive index higher than that of a cladding into the cladding on a substrate, the interferometer comprising: at least two types of annealing regions that are provided near the optical waveguide, wherein an optical path length of the optical waveguide is trimmed by partially changing an effective refractive index of the optical waveguide by applying annealing to the annealing regions.

Here, as for the structure of the annealing regions: the annealing regions may differ in their width; at least one of the annealing regions may have a width equal to or greater than 2.6 times a distance d from the core center to the top surface of the cladding, or at least one of the annealing regions may have a width equal to or less than 1.4 times the distance from the core center to the top surface of the cladding; the annealing regions may differ in their distances from the optical waveguide to the annealing regions; the annealing regions may differ in presence or absence of a slit formed in the annealing regions in an optical waveguide direction, or in slit width; the annealing regions may differ in presence or absence of a trench formed by partially removing a cladding around the optical waveguide, or in distance from the optical waveguide to trenches, or in depth of the trenches; the interferometer may further comprise fixed delay means for providing delay dependent on a polarization state; and the interferometer may comprise at least one optical coupler and a plurality of optical waveguides connected to the optical coupler.

The interferometer may comprise two 2×2 optical couplers and two optical waveguides connecting the optical couplers, wherein optical path length difference (delay difference) between the two optical waveguides may be trimmed by local annealing (heating) such that it may be an odd multiple of $\lambda/2$ for a transverse electric polarization mode and an even multiple of $\lambda/2$ for a transverse magnetic polarization mode, where $\lambda$ is a wavelength, or that it may be an even multiple of $\lambda/2$ for the transverse electric polarization mode and an odd multiple of $\lambda/2$ for the transverse magnetic polarization mode; at least one of the two optical waveguides connecting the two 2×2 optical couplers may comprise polarization dependent fixed delay means; and the local annealing regions may consist of a thin film heater formed on the optical waveguide.

As for the interferometer in which the independent effective refractive index control is not necessary for the transverse electric polarization mode and for the transverse magnetic polarization mode, and desired optical characteristics are achieved by polarization independent trimming, according to a second aspect of the present invention, there is provided an interferometer using an optical waveguide, which is formed by embedding a core that has a refractive index higher than that of a cladding into the cladding on a substrate, the interferometer comprising: one type of annealing region that has a width from 1.4 to 2.6 times a distance from the optical waveguide core center to a top surface of the cladding in a neighborhood of the optical waveguide, wherein an optical path length of the optical waveguide is trimmed by changing an effective refractive index of the optical waveguide by applying annealing to the annealing region.

According to a third aspect of the present invention, there is provided an interferometer fabrication method, wherein local annealing regions utilize thin film heaters formed on the optical waveguide.

As described above, the interferometer in accordance with the present invention can adjust the birefringence index by changing the film quality of the cladding by locally annealing it to cause the stress change by the changing.

In addition, the interferometer may include at least two types of local annealing regions with a stress distribution inducing structure. Accordingly, it has at least two independent trimming parameters with different polarization dependency of the permanent effective refractive index changes. As a result, it can perform completely independent birefringence index trimming for the transverse electric polarization mode and for the transverse magnetic polarization mode.

When the width of the local annealing (heating) region is 1.4–2.6 times the distance from the top surface of the over-cladding to the core center, the change in the effective refractive index is approximately independent of the polarization state. Accordingly, the one type of local annealing region can adjust the optical path length (phase) in a polarization independent manner.

In particular, using the thin film heaters in the local annealing obviates the need for high accuracy alignment of the irradiation position at the local annealing. Thus, simply supplying current to a predetermined thin film heater is enough to achieve the trimming, thereby enabling the trimming using a rather simple device, which is very advantageous in putting the device in accordance with the present invention into practical use.

Moreover, applying the present invention to various types of interferometers such as a polarization beam splitter enables the interference optical path length to be adjusted for each polarization mode, thereby making it possible to achieve high optical characteristics without the phase control using the thermo-optic effect. Thus, the present invention is very advantageous in terms of the power saving of the interferometer.

The above and other objects, effects, features and advantages of the present invention will become more apparent from the following description of embodiments thereof taken in conjunction with the accompanying drawings.

BRIEF DESCRIPTION OF THE DRAWINGS

FIG. 1A is a plane view of a conventional polarization beam splitter (PBS);

FIG. 1B is a cross-sectional view taken along the line 1B—1B of FIG. 1A showing the conventional polarization beam splitter (PBS);

FIG. 1C is a cross-sectional view taken along the line 1C—1C of FIG. 1A showing the conventional polarization beam splitter (PBS);

FIG. 4A is a plane view of a polarization beam splitter (PBS) as a first embodiment in accordance with the present invention;

FIG. 4B is a cross-sectional view taken along the line IVB—IVB of FIG. 4A showing the polarization beam splitter (PBS) of the first embodiment in accordance with the present invention;

FIG. 4C is a cross-sectional view taken along the line IVC—IVC of FIG. 4A showing the polarization beam splitter (PBS) of the first embodiment in accordance with the present invention;

FIG. 6A is a plane view of a polarization beam splitter (PBS) as a second embodiment in accordance with the present invention;

FIG. 6B is a cross-sectional view taken along the line VIB—VIB of FIG. 6A showing the polarization beam splitter (PBS) of the second embodiment in accordance with the present invention;

FIG. 6C is a cross-sectional view taken along the line VIC—VIC of FIG. 6A showing the polarization beam splitter (PBS) of the second embodiment in accordance with the present invention;

FIG. 7A is a plane view of a polarization beam splitter (PBS) as a third embodiment in accordance with the present invention;

FIG. 7B is a cross-sectional view taken along the line VIIB—VIIB of FIG. 7A showing the polarization beam splitter (PBS) of the third embodiment in accordance with the present invention;

FIG. 9A is a plane view showing a variation of the basic configuration in accordance with the present invention;

FIG. 9B is a cross-sectional view taken along the line IXB—IXB of FIG. 9A showing the variation of the basic configuration in accordance with the present invention;

FIG. 9C is a cross-sectional view taken along the line IXC—IXC of FIG. 9A showing the variation of the basic configuration in accordance with the present invention;

DESCRIPTION OF THE PREFERRED EMBODIMENTS

The embodiments in accordance with the present invention will now be described with reference to the accompanying drawings.

Figure 2A:
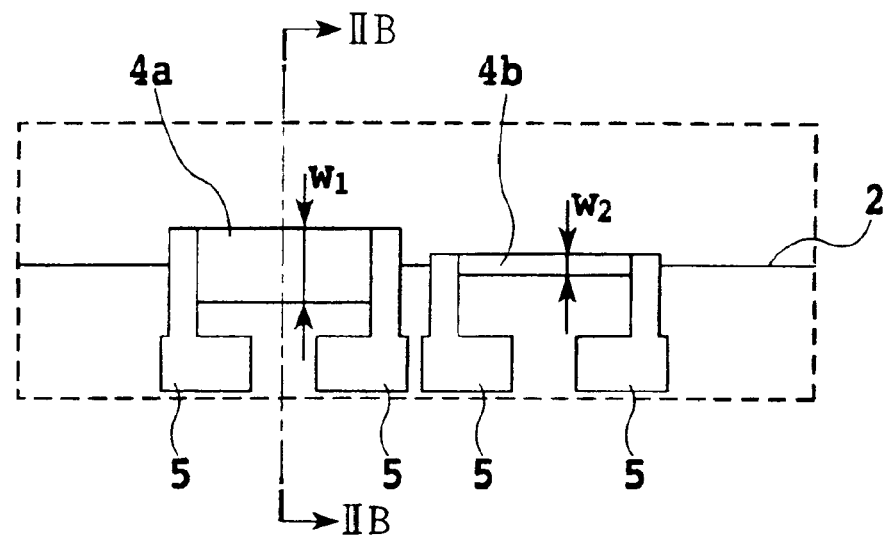
FIG. 2A is a plane view showing a basic configuration of the interferometer in accordance with the present invention.
Figure 2B:
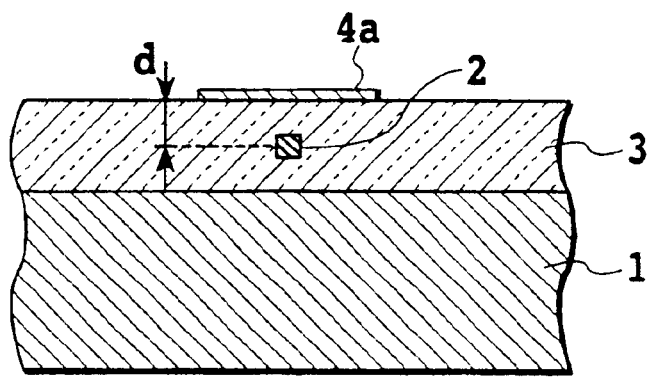
FIG. 2B is a cross-sectional view taken along the line IIB—IIB of FIG. 2A showing the basic configuration of the interferometer in accordance with the present invention.

FIGS. 2A and 2B are views showing a basic structure of an interferometer in accordance with the present invention. The interferometer, which is formed as a part of the waveguide arms for establishing the optical path length difference, comprises two types of local annealing(heating) regions with different widths as shown in FIG. 2A. In FIGS. 2A and 2B, the reference numeral 1 designates a silicon substrate, 2 designates a waveguide core, 3 designates a cladding, 4a and 4b each designates a local annealing thin film heater and 5 designates a feeding electrode and electrode pad.

Figure 3:
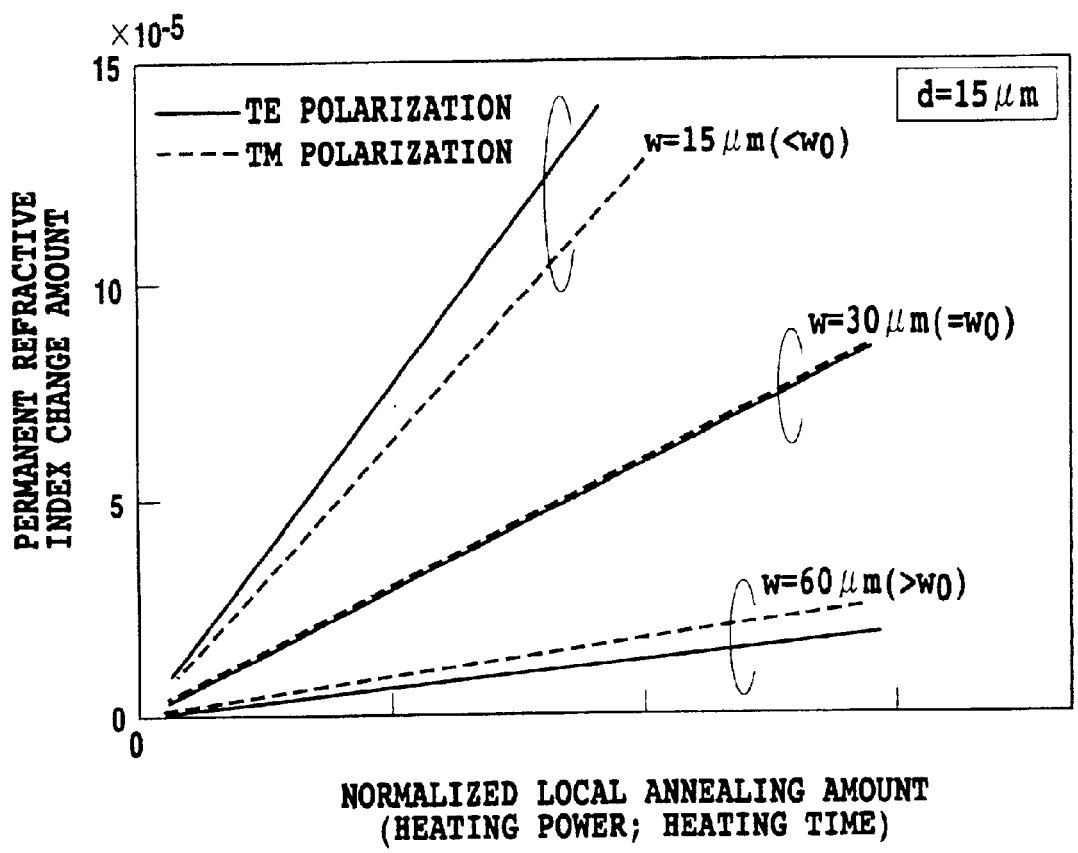
FIG. 3 is a characteristic diagram illustrating permanent refractive index changes by local annealing.

It is assumed in FIGS. 2A and 2B that the refractive index changes by the local annealing by the heater with a width w are $\delta_{TE}$ and $\delta_{TM}$ for respective polarization modes, that the refractive index change at the average polarization is $\delta_a$ (=$(\delta_{TE}+\delta_{TM})/2$), and that the polarization dependency difference between the refractive index changes is $\delta_p$ (=$\delta_{TE}-\delta_{TM}$). In this case, since the refractive index dependency difference $\delta_p$ is approximately proportional to the average refractive index change $\delta_a$ as illustrated in FIG. 3, it can be expressed as $\delta_p = C(w) \cdot \delta_a$. Here, C(w) is a proportionality constant, which depends on the width of the local annealing region as shown in FIG. 3. The polarization independence C is zero (C=0) when w=$w_o$; less than zero (C<0) when w>$w_o$ at which the transverse magnetic polarization mode is dominant; and greater than zero (C>0) when w<$w_o$ at which the transverse magnetic polarization mode is dominant. Here, $w_o$ is twice the distance d from the top surface of the over-cladding to the core center. As for the waveguide having two types of local annealing regions with the widths $w_1$ and $w_2$ as shown in FIG. 2A, the total average refractive index change $\delta_A$ and the total polarization dependent refractive index difference $\delta_P$ are expressed as follows:

$$\delta_A = \delta_{a1} + \delta_{a2} \tag{1a}$$

$$\delta_P = \delta_{p1} + \delta_{p2} = C(w_1) \cdot \delta_{a1} + C(w_2) \cdot \delta_{a2} \tag{1b}$$

Thus, the determinant of the equation is nonzero when $C(w_1) \neq C(w_2)$. Accordingly, the $\delta_{a1}$ and $\delta_{a2}$ that satisfy given $\delta_A$ and $\delta_P$ are uniquely determined. Therefore, the average refractive index change $\delta_A$ and the polarization dependent refractive index difference $\delta_P$ can be controlled completely independently, thereby enabling the transverse electric polarization mode and the transverse magnetic polarization mode to be controlled completely independently.

In the case where the width of the local annealing region is in a range of 1.4–2.6 times the distance from the top surface of the over-cladding to the core center, which nearly equals $w_o$ (±30%) that is about twice the distance, the change in the effective refractive index is nearly independent of the polarization state. Accordingly, only one local annealing region is enough to trim the optical path length (phase) in a polarization independent manner.

In the local annealing, since the refractive index change usually takes a positive value, there is a restriction that $\delta_{a1}$ and $\delta_{a2}$ are positive. However, since the optical path length difference of the interferometer is a relative value, the negative values are allowed by increasing the optical path length of the other path.

The present invention will now be described in more detail using concrete embodiments. Here, the following embodiments are assumed to employ silica-based single mode optical waveguides formed on a silicon substrate because the silica-based waveguides have superior characteristics such as low loss, long-term stability and good affinity for communication silica fibers as described at the top of the specification. However, it is obvious the present invention is applicable to all the materials that allow the stress control of the cladding by the local annealing. For example, they can be combined with other materials such as a quartz substrate or sapphire substrate as a substrate material, or with a composite glass, polymer material or lithium niobate as an optical waveguide.

In the following description, the components with the same functions as those of FIGS. 2A and 2B are designated by the same reference numerals to omit unnecessary duplication of the description.

[EMBODIMENT 1: PBS1]

FIGS. 4A–4C shows a configuration of a polarization beam splitter (PBS) of a first embodiment used as an interferometer. Here, FIG. 4A is a plane view, FIG. 4B is a cross-sectional view taken along the line IVB—IVB of FIG. 4A, and FIG. 4C is a cross-sectional view taken along the line IVC—IVC of FIG. 4A. In FIGS. 4A–4C, the reference numeral 8 designates a stress releasing groove ($\lambda/2$ polarization dependent delay means), reference numerals 41a and 41b each designate a local annealing thin film heater (w≈$w_o$), 42a and 42b each designate a local annealing thin film heater (w>$w_o$), and 43a and 43b each designate a local annealing thin film heater (w<$w_o$).

The PBS comprises, on an MZI that is composed of two 50% (3 dB) optical couplers 7 and 7, two waveguide arms 2a and 2b linking the two couplers, and input/output waveguides connecting input/output ports with the couplers, the $\lambda/2$ polarization dependent delay means 8 for providing the MZI with the optical path length change of about $\lambda/2$ ($\lambda$ is a wavelength) depending on the polarization state of the transverse electric polarization mode and the transverse magnetic polarization mode; and the thin film heaters 41a, 41b, 42a, 42b, 43a and 43b that are mounted on both sides of the waveguide arms and operate as the local annealing (heating) means with three types of widths.

The PBS of the present embodiment employs directional couplers formed by placing the two waveguides in close proximity of about a few micrometers as the 3 dB couplers 7 and 7. This is because the directional couplers have a lower insertion loss than other components. However, the 3 dB couplers are not limited to this configuration. For example, it is possible to employ multi-mode interference couplers (MMIs) utilizing multi-mode waveguides, or wavelength insensitive couplers (WINC) formed by connecting these couplers in cascade.

The PBS of the present embodiment employs a structure that provides the stress releasing grooves 8 on both sides of one of the waveguide arms as the λ/2 polarization dependent delay means (see, Japanese Patent Application Laying-open No. 63-182608 (1988)). This is because the structure using the stress releasing grooves 8 has a low insertion loss. However, the λ/2 polarization dependent delay means is not limited to this structure. Other configurations are also allowed such as inserting a half wave-plate into one of the waveguide arms with the principle axis forming zero degree or 90 degrees with the arm. In addition, although the stress releasing grooves 8 are formed at the upper waveguide arm (at the sides of the waveguide core 2a) in the present PBS to establish the λ/2 polarization dependent delay difference, since the delay difference is relative, they can be formed on the lower waveguide arm (at the sides of the waveguide core 2b), or at both sides of them with the grooves different in length on the upper and lower sides to implement the λ/2 polarization dependent delay difference.

Furthermore, since the optical path length of each waveguide arm is determined as a line integral of the effective refractive index on the waveguide, the λ/2 polarization dependent delay means 8 and the local annealing means 41a, 41b, 42a, 42b, 43a and 43b with the three types of widths can be arranged in any order on the waveguide arms.

The PBS of the present embodiment was formed on the one millimeter thick silicon substrate 1 with a diameter of four inches by using a conventional technique. The silica-based waveguides were formed by a combination of the reactive ion etching technique with the deposition technique of a silica-based glass film based on the flame hydrolysis reaction deposition technique that utilized the hydrolysis reaction of the material gases such as $SiCl_4$ or $GeCl_4$, and the local annealing (heating) thin film heaters 41a, 41b, 42a, 42b, 43a and 43b were formed by the vacuum deposition and etching, followed by forming the stress releasing grooves 8 by the reactive ion etching. The cross section of the cores is 6 μm×6 μm square. The cores 2a and 2b are surrounded by the cladding 3 of about 40 μm thick, and the core center is located at a distance of 15 μm from the top surface of the cladding. The relative refractive index difference between the cores 2a and 2b and the cladding 3 is 0.75%.

The arm length of the two waveguide arms was about 20 mm with the arm length difference being zero, and the arm spacing was 1 mm. Each of the stress releasing grooves 8 was about 1.9 mm long in the waveguide direction and 50 μm wide. The distance from the waveguide center to each stress releasing groove 8 was 25 μm. The three types of the thin film heaters have a width of 15 μm ($<w_o$) (43a, 43b), 30 μm ($\approx w_o$) (41a, 41b) and 60 μm ($>w_o$) (42a, 42b) with a length of 5 mm, where $w_o$ is about twice the distance from the top surface of the over-cladding to the core center.

The wafer was diced and fixed to a ceramic substrate. The input/output ports 11a, 11b, 12a and 12b were each connected to a single mode fiber, and the thin film heaters 41a, 41b, 42a, 42b, 43a and 43b were each connected with a feeding lead via the feeding electrode pad 5, thereby completing the PBS module.

The optical circuit fabricated through the foregoing process has a strong compressive stress in the direction within the surface because of the thermal expansion difference between the silicon substrate and the silica-based glass. Accordingly, the waveguides have a waveguide birefringence of $4 \times 10^{-4}$, with the transverse magnetic polarization mode having a slightly higher refractive index than the transverse electric polarization mode. On the other hand, since the stress is released by the stress releasing grooves 8, the waveguide birefringence at that portion is about zero. Therefore, the presence and absence of the 1.9 mm long stress releasing grooves 8 in the two waveguide arms cause the polarization dependency of about λ/2 in the optical path length difference. As a result, the present circuit constitutes the MZI with the optical path length difference of about zero in the transverse electric polarization mode, and the MZI with the optical path length difference of about λ/2 in the transverse magnetic polarization mode. Thus, according to the well-known interference principle, as for the light launched into the input port (11b), the light in the transverse electric polarization mode is led to the cross port (12a), and the light in the transverse magnetic polarization mode is led to the bar port (12b).

The term "about" is used in the foregoing description because the optical circuit fabricated has some fabrication error, and hence the designed optical path length difference usually deviates slightly. Thus, to achieve a satisfactory extinction ratio, it is very important to correct the error accurately. The correction method, the subject matter of the present invention, will now be described in detail.

Figure 5A:
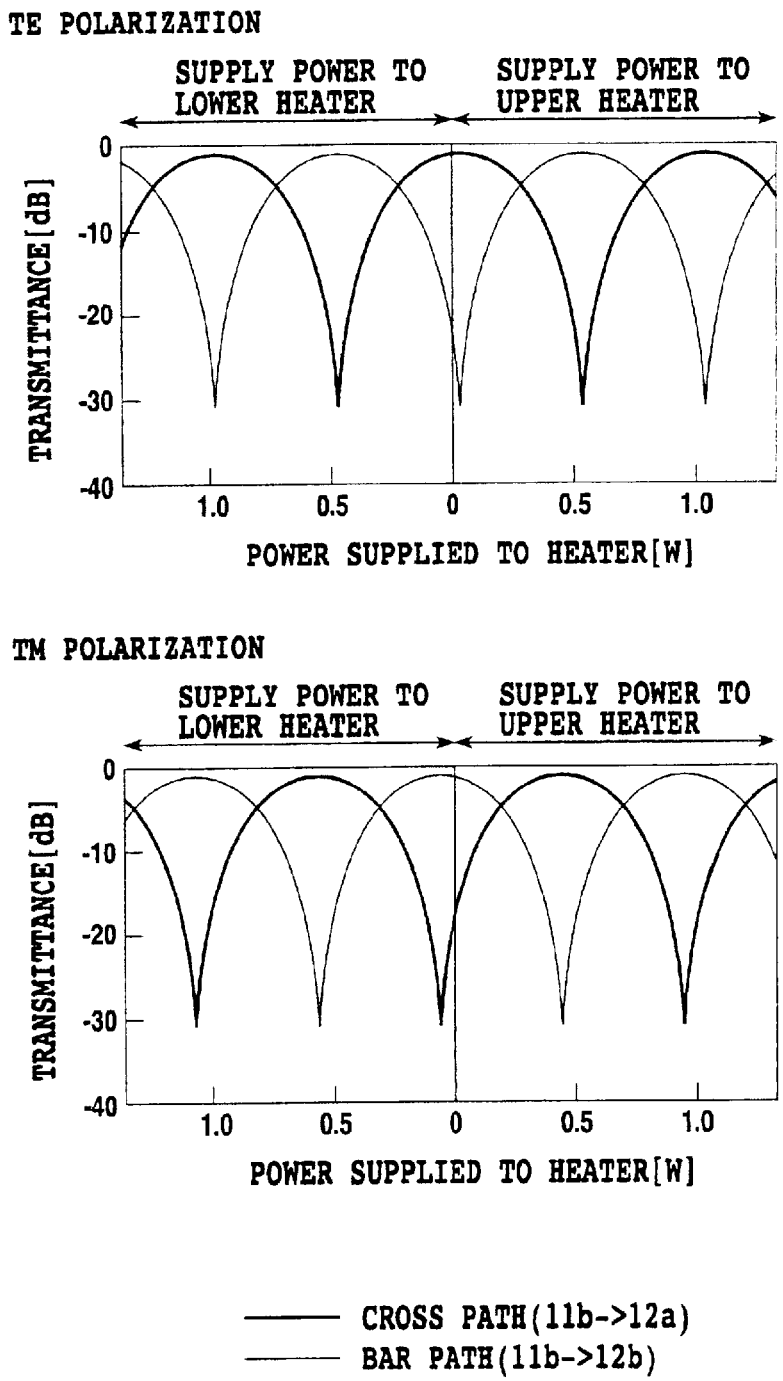
FIG. 5A is characteristic diagrams illustrating the optical path length differences of the PBS before trimming.

FIG. 5A illustrates the characteristics of the present PBS. The characteristics were measured using the thin film heaters with the width of 30 μm as a thermo-optic phase shifter. The horizontal axis represents the driving power supplied to the thin film heater. In FIG. 5A, the right-hand side represents the case where the upper thin film heater 41a was fed, whereas the left-hand side represents the case where the lower thin film heater 41b was fed. As illustrated in this figure, when the driving power is zero, the light in the transverse electric polarization mode leaks into the bar port 12b, and the light in the transverse magnetic polarization mode leaks into the cross port 12a, resulting in only an insufficient extinction ratio. In addition, it is found from the driving characteristics that to achieve a sufficient extinction ratio, the effective refractive index of the upper arm must be increased to lengthen its optical path length to some extent in the transverse electric polarization mode, and the effective refractive index of the lower arm must be increased to some extent to lengthen its optical path length in the transverse magnetic polarization mode.

As illustrated in FIG. 3, the local annealing by the thin film heaters with various widths enables the control of the effective refractive index. Specifically, the thin film heater with the width of 30 μm can achieve the polarization independence (C≈0 in expression (1b)); the thin film heater with the width of 15 μm can increase the effective refractive index with about 25% dominance (C≈0.25 in expression (1b)) of the transverse electric polarization mode; and the thin film heater with the width of 60 μm can increase the effective refractive index with about 25% dominance (C≈−0.25 in expression (1b)) of the transverse magnetic polarization mode.

This trimming was carried out in the two steps: (1) trimming the difference $\Delta L_P$ (=$\Delta L_{TE}$−$\Delta L_{TM}$) to $\lambda/2$, where $\Delta L_{TE}$ was the optical path length difference (=upper arm−lower arm) between the waveguide arms in the transverse electric polarization mode, and $\Delta L_{TM}$ was the optical path length difference between the two arms in the transverse magnetic polarization mode; and (2) trimming to $\Delta L_{TE}$=0 (and hence, $\Delta L_{TM}$=$\lambda/2$).

At the end of the fabrication of the circuit whose characteristics are illustrated in FIG. 5A, the $\Delta L_P$ is about 0.8·$\lambda/2$. As described above, the local annealing using the 15 μm wide thin film heater 43a of the upper arm or the 60 μm wide thin film heater 42b of the lower arm will both increase the $\Delta L_p$. The optical path length differences $\Delta L_{TE}$ and $\Delta L_{TM}$ in both the polarization will increase when using the thin film heater 43a of the upper arm, and decrease when using the thin film heater 42b of the lower arm.

Figure 5B:
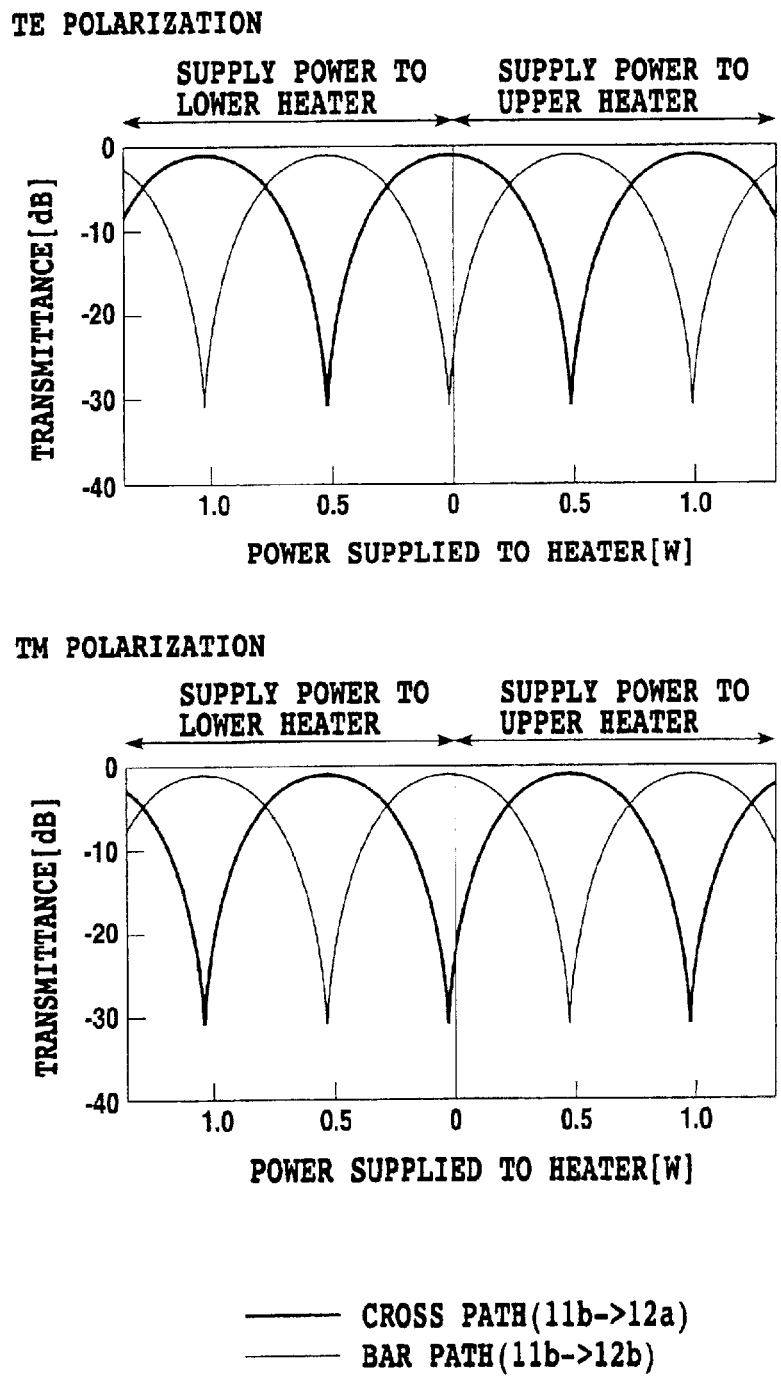
FIG. 5B is characteristic diagrams illustrating the optical path length differences of the PBS after the birefringence trimming.

In view of this, the trimming was performed by using both the thin film heaters 43a and 42b so that the $\Delta L_{TE}$ and $\Delta L_{TM}$ do not deviate greatly to one direction during the trimming of the $\Delta L_p$. More specifically, the thin film heater 43a was supplied with the power of 7.5 W, and the thin film heater 42b was supplied with the power of 10 W, each of which was supplied for a few seconds, at several times. Thus, the local annealing was carried out with observing the changes in the $\Delta L_{TE}$ and $\Delta L_{TM}$ at each step. As a result, the local annealing, which was applied to the thin film heater 43a for 20 seconds in total, and to the thin film heater 42b for 100 seconds in total, was able to establish the permanent phase characteristics of the PBS at $\Delta L_p$=$\lambda/2$ as illustrated in FIG. 5B.

Figure 5C:
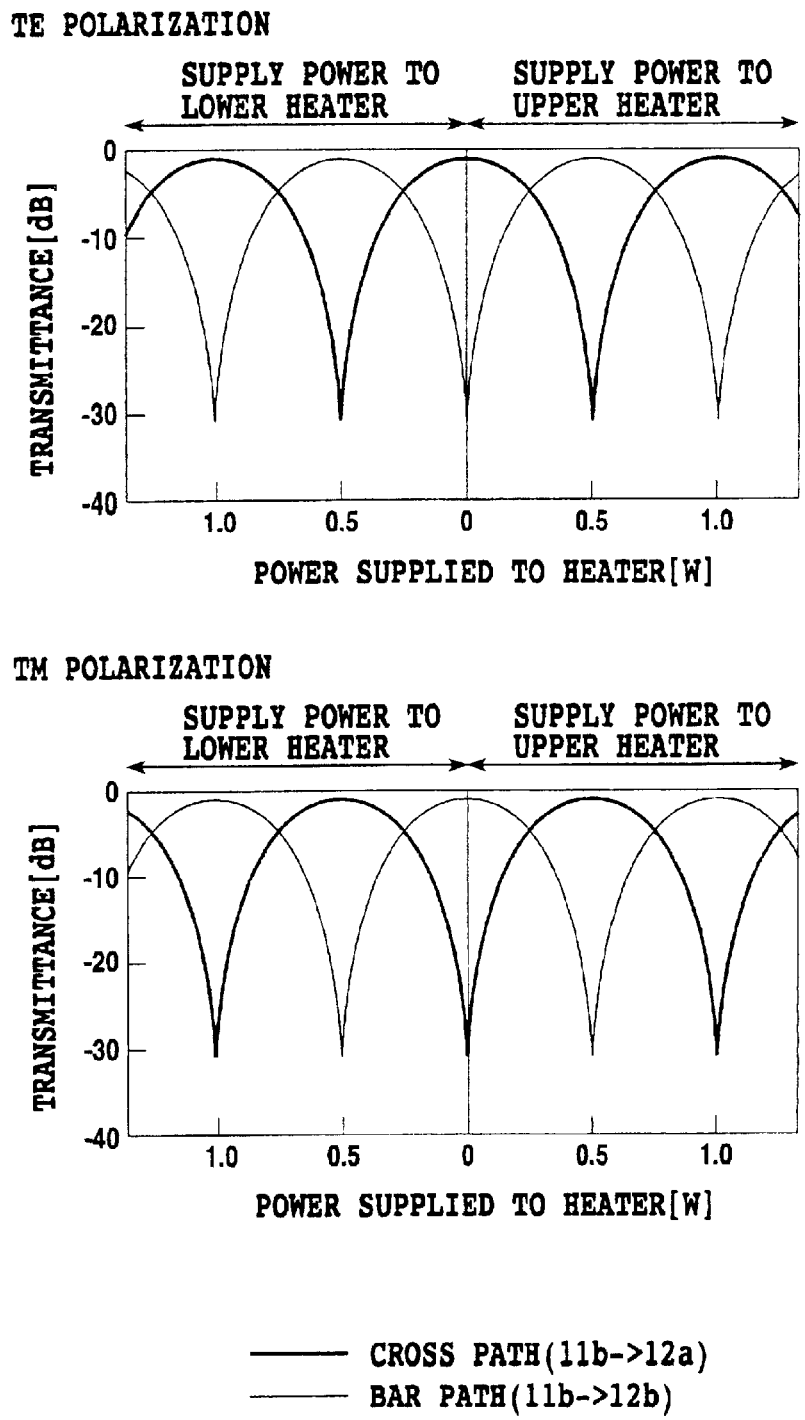
FIG. 5C is characteristic diagrams illustrating the optical path length differences of the PBS after the birefringence trimming and effective refractive index trimming.

Although the $\Delta L_p$ was set at $\lambda/2$, the $\Delta L_{TE}$=0.07·$\lambda/2$. Accordingly, the local annealing was carried out using the 30 μm wide thin film heater 41b of the lower arm to trim the $\Delta L_{TE}$ to zero. As described above, since the local annealing using the 30 μm wide thin film heater can increase the refractive index in an approximately polarization independent manner, the trimming of the $\Delta L_{TE}$ can be implemented with maintaining the $\Delta L_P$=$\lambda/2$. More specifically, the local annealing was performed by supplying the thin film heater 41b with the power of 6 W for ten seconds. As a result, the phase characteristics of the PBS as illustrated in FIG. 5C were obtained. Thus, the $\Delta L_{TE}$=0 (that is, $\Delta L_{TM}$=−$\lambda/2$) was achieved with maintaining the relationship $\Delta L_p$=$\lambda/2$.

As a result, the following satisfactory conditions were established even at the zero driving power: the insertion loss was about 1 dB; and the polarization extinction ratio was about 30 dB in both the transverse electric polarization mode and transverse magnetic polarization mode.

In this trimming, although the local annealing was carried out by dividing the annealing time and by controlling the total annealing time according to the changes in the $\Delta L_{TE}$ and $\Delta L_{TM}$ for accuracy, the annealing can be performed at one time when some error is accepted.

In addition, although the trimming was carried out through two distinct steps (1) and (2), the former trimming the polarization dependent phase differences and the latter trimming the phase difference in a polarization independent manner, a slight deviation of the $\Delta L_p$ could remain after the step (2) in some samples. In such a case, the trimming can be repeated from the step (1).

Although the trimming carried out both the steps (1) and (2), the former trimming the polarization dependent phase differences, and the latter trimming the phase difference in a polarization independence manner, since the latter can be achieved using the thermo-optic effect, for example, it is possible to perform only the step (1) with omitting the step (2), followed by the trimming using a thermo-optic phase shifter. In this case, however, since the thermooptic phase shifter must be continuously supplied with the driving power, the trimming using both the steps (1) and (2) is preferable from the viewpoint of power saving.

The trimming did not use the thin film heaters 43b and 42a. This is because the polarization dependency difference $\Delta L_{p(o)}$ in the optical path length difference in the initial state was less than the finally set polarization dependency difference $\Delta L_{p(f)}$ (which is equal to $\lambda/2$ in this case). Therefore, designing the $\lambda/2$ polarization dependent delay means 8 such that the relationship $\Delta L_{p(o)}$ < $\Delta L_{p(f)}$ always holds considering the fabrication error enables the thin film heaters 43b and 42a to be omitted, thereby reducing the circuit size. On the contrary, designing such that the relationship $\Delta L_{p(o)}$ > $\Delta L_{p(f)}$ holds enables the thin film heaters 43a and 42b to be omitted.

In addition, the $\Delta L_p$ can be increased by the local annealing using the 15 μm wide thin film heater 43a of the upper arm or the 60 μm wide thin film heater 42b of the lower arm. Furthermore, the optical path length differences $\Delta L_{TE}$ and $\Delta L_{TM}$ of the individual polarization can be increased by the local annealing using the thin film heater 43a, and decreased by that using the thin film heater 42b. Accordingly, sharing the amount of the local annealing between the upper arm and lower arm makes it possible to trim the $\Delta L_p$ to $\lambda/2$, and the $\Delta L_{TE}$ to zero. Thus, the thin film heaters 41a and 41b can be omitted in this case, thereby being able to further reduce the circuit size. This will be described in more detail in the embodiment 2.

In the PBS of the present embodiment 1, although the optical path length difference between the waveguide arms was set zero to the transverse electric polarization mode, and $\lambda/2$ to the transverse magnetic polarization mode, this is not essential. Principally, the optical path length difference between the waveguide arms can be set at an integer multiple of $\lambda/2$ in the transverse electric polarization mode, and at the optical path length difference in the transverse electric polarization mode plus or minus an odd multiple of $\lambda/2$ in the transverse magnetic polarization mode to enable the PBS to operate. However, since an increasing optical path length difference in the MZI generally enhances the wavelength dependency, it will limit the wavelength band that can provide a sufficient extinction ratio. Accordingly, it is preferable that the optical path length difference be small.

[EMBODIMENT 2: PBS2]

FIGS. 6A–6C show a configuration of a polarization beam splitter (PBS) in a second embodiment used as an interferometer. FIG. 6A is a plane view, FIG. 6B is a cross-sectional view taken along the line VIB—VIB of FIG. 6A, and FIG. 6C is a cross-sectional view taken along the line VIC—VIC of FIG. 6A. Although the configuration is similar to that of the PBS of the first embodiment, it differs in that the number and types of the thin film heaters are reduced. Specifically, it comprises only two types of thin film heaters, a 15 μm (<$w_o$) wide thin film heater 43 and a 60 μm (>$w_o$) wide thin film heater 42, each assigned to one of the arms as a local annealing(heating) means. In addition, the stress releasing grooves 8 as a $\lambda/2$ polarization dependent delay means are designed slightly shorter at 1.7 mm so that the polarization dependency difference $\Delta L_p$ of the optical path length difference between the waveguide arms becomes always less than $\lambda/2$ (that is, $L_{p(o)}$<$\Delta L_{p(f)}$).

The optical circuit of the second embodiment is formed to a module by the same fabrication method as the first embodiment.

Estimating the characteristics using the thin film heaters 43 and 42 as in the first embodiment gives the values $\Delta L_{TE(o)}=-0.1\cdot\lambda/2$, $\Delta L_{TM(o)}=-0.8\ \lambda/2$, and $\Delta L_{p(o)}=0.7\cdot\lambda/2$. Accordingly, the trimming amounts needed for the individual polarization are $\delta L_{TE}$ $(=\Delta L_{TE(f)}-\Delta L_{TE(o)})=0.1\cdot\lambda/2$, and $\delta L_{TM}$ $(=\Delta L_{TM(f)}-\Delta L_{TM(o)})=-0.2\cdot\lambda/2$. Therefore, the trimming amount of the polarization dependency difference and the trimming amount of the optical path length of the polarization independence are $\delta L_p=0.3\cdot\lambda/2$, and $\delta L_a=-0.05\cdot\lambda/2$, respectively.

Since both the thin film heaters 43 and 42 have a length l=5 mm, the change amount $\delta L_p$ of the polarization dependency difference and the optical path length change amount $\delta L_a$ of the polarization independence by the local annealing are given by the following expressions:

$$\delta L_a = 1\cdot(\delta_{a1}-\delta_{a2}) \qquad (2b)$$

$$\delta L_p = 1\cdot(\delta_{p1}-\delta_{p2}) = 1\cdot(C_1\cdot\delta_{a1}-C_2\cdot\delta_{a2}) \qquad (2b)$$

where $\delta_{a1}$ and $\delta_{a2}$ are refractive index changes of the polarization independence, and $\delta_{p1}$ and $\delta_{p2}$ are polarization dependency differences of the refractive index changes due to the local annealing by the thin film heaters 43 and 42. As described before, since $C_1=0.25$ in the 15 µm wide thin film heater 43, and $C_2=-0.25$ in the 60 µm wide thin film heater 42, solving the simultaneous equations gives $\delta_{a1}=8.9\times10^{-5}$ and $\delta_{a2}=9.7\times10^{-5}$.

To implement the refractive index changes, the thin film heater 43 was supplied with the power of 7.5 W for 28 seconds, and the thin film heater 42 with the power of 12 W for 67 seconds to achieve the local annealing. As a result, the $L_{TE}=0$ and $\Delta L_{TM}=\lambda/2$ were established permanently. Thus, the following satisfactory conditions were established even at the zero driving power: the insertion loss was about 1 dB; and the polarization extinction ratio was about 30 dB in both the transverse electric polarization mode and transverse magnetic polarization mode.

[EMBODIMENT 3: PBS3]

FIGS. 7A and 7B shows a configuration of a polarization beam splitter (PBS) used as an interferometer of a third embodiment. FIG. 7A is a plane view; and FIG. 7B is a cross-sectional view taken along the line VIIB—VIIB of FIG. 7A. The configuration is similar to the PBS of the second embodiment except that it does not comprise the $\lambda/2$ polarization dependent delay means, but comprises a plurality of thin film heaters 43a–43d with the same structure and thin film heaters 42a–42d with the same structure as the local annealing(heating) means. In addition, the PBS has the optical path length difference of $\lambda/2$ with making the upper waveguide slightly longer in order to level out the amounts of the heating power as will be described later. The total length of the thin film heaters, that is, the total length of the local annealing regions, is increased from that of the second embodiment by 20 mm considering the trimming amount in this embodiment.

In addition, the spacing between the waveguide arms is set at 250 µm.

The PBS of the present embodiment is formed into a module by the same fabrication method as the first embodiment.

Measuring the characteristics using the thin film heaters 43a and 42a as in the first embodiment gave the values $\Delta L_{TE(o)}=\lambda/2$, $\Delta L_{TM(o)}=\lambda/2$, and $\Delta L_{p(o)}=0$. The PBS of the present embodiment comprises four thin film heaters for each waveguide arm, with the total length thereof l=20 mm.

Accordingly, the calculation as in the second embodiment gave the desired refractive index changes of $\delta_{a1}=9.7\times10^{-5}$ and $\delta_{a2}=5.8\times10^{-5}$.

To bring about the refractive index changes, the local annealing was carried out by sequentially supplying the 15 µm ($<w_o$) long thin film heaters 43a–43d with the power of 7.5 W for 50 seconds, and the 60 µm ($>w_o$) long thin film heaters 42a-42d with the power of 10W for 100 seconds. As a result, the $L_{TE}=0$ and $\Delta L_{TM}=-\lambda/2$ were established permanently. Thus, the following satisfactory conditions were established even at the zero driving power: the insertion loss was about 1dB; and the polarization extinction ratio was about 30 dB in both the transverse electric polarization mode and transverse magnetic polarization mode.

When heating by the same power, the local annealing using a narrower heater usually has a greater heating density per unit area than the local annealing using a wider heater, thereby causing a larger refractive index change as illustrated in FIG. 3. In view of this, the PBS of the present embodiment established the optical path length difference of $\lambda/2$ in the MZI so that the refractive index change $\delta_{a2}$ by the 60 µm wide thin film heaters 42a–42d became smaller than the refractive index change $\delta_{a1}$ by the 15 µm wide thin film heaters 43a–43d, thereby leveling out the heating power amounts.

In the present embodiment, although the local annealing was performed for the four thin film heaters 43a–43d and the four thin film heaters 42a–42d separately, this is not essential. It can be carried out simultaneously. Alternatively at least one of the two sets, where one set consists of the four thin film heaters 43a–43d of the upper waveguide arm and the other set consists of the four thin film heaters 42a–42d of the lower waveguide arm, can be made one type of thin film heater of 20 mm long, without dividing into four heaters. In this case, however, since the thin film heater of the lower waveguide arm in particular requires the power of no less than 40W, a powerful cooling system for the substrate is necessary.

Furthermore, although the PBS of the present embodiment divides the thin film heaters with the total length of 20 mm into four equal parts, this is not essential. For example, they can be divided into unequal parts, such as 15 mm and 5 mm so that the 15 mm long heater is used for rough trimming, and the 5 mm long heater is used for fine trimming.

[EMBODIMENTS 4–7: Applications to Other Interferometers]

FIGS. 8A–8D show embodiments as applications to various interferometers.

Figure 8A:
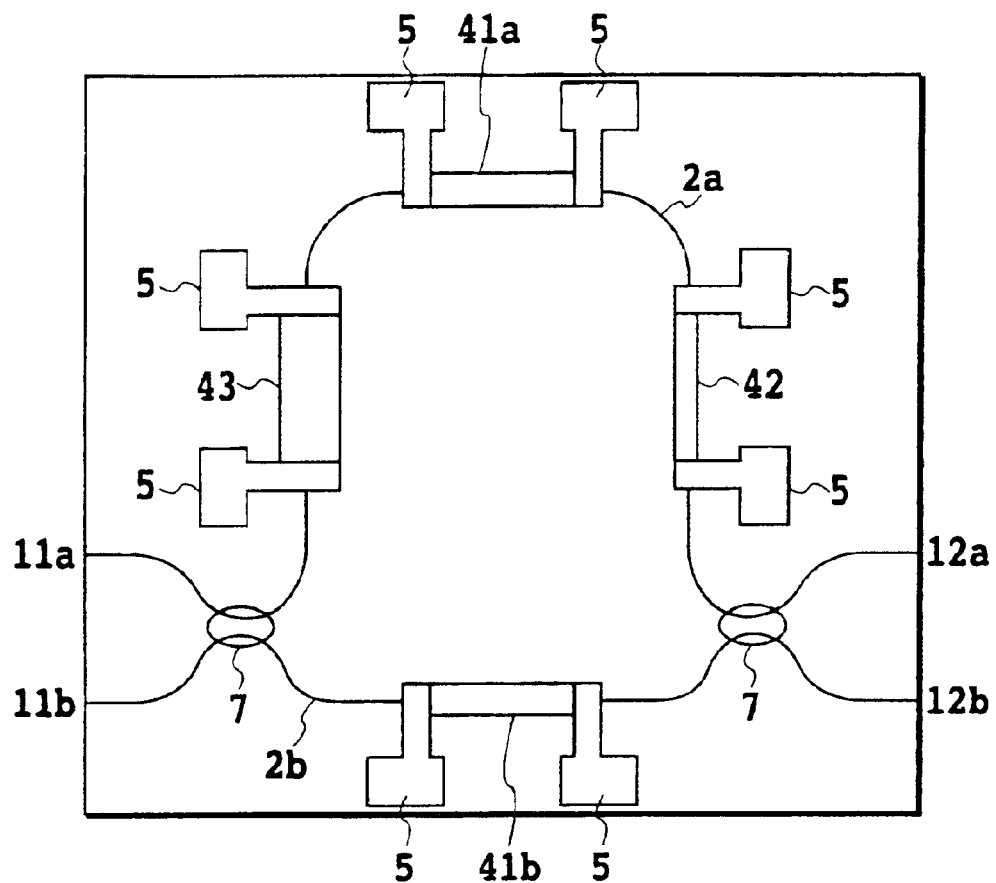
FIG. 8A is a plane view showing a Mach-Zehnder interferometer as a fourth embodiment in accordance with the present invention.

FIG. 8A shows an example of a Mach-Zehnder interferometer (transmission Interferometer) that has a desired optical path length difference between the waveguide arms between the couplers.

Figure 8B:
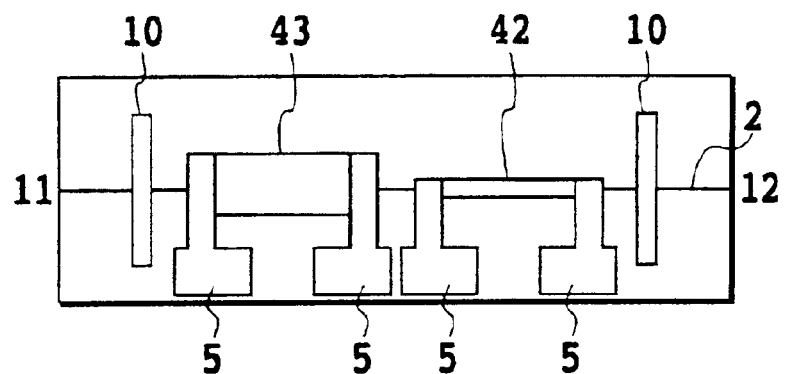
FIG. 8B is a plane view showing a Michelson interferometer as a fifth embodiment in accordance with the present invention.

FIG. 8B shows an example of a Michelson interferometer (reflection interferometer) that comprises reflectors 9 at the end of the optical paths branching from the coupler, and has a desired optical path length difference between the round-trip optical path length difference between the coupler and the reflector 9.

Figure 8C:
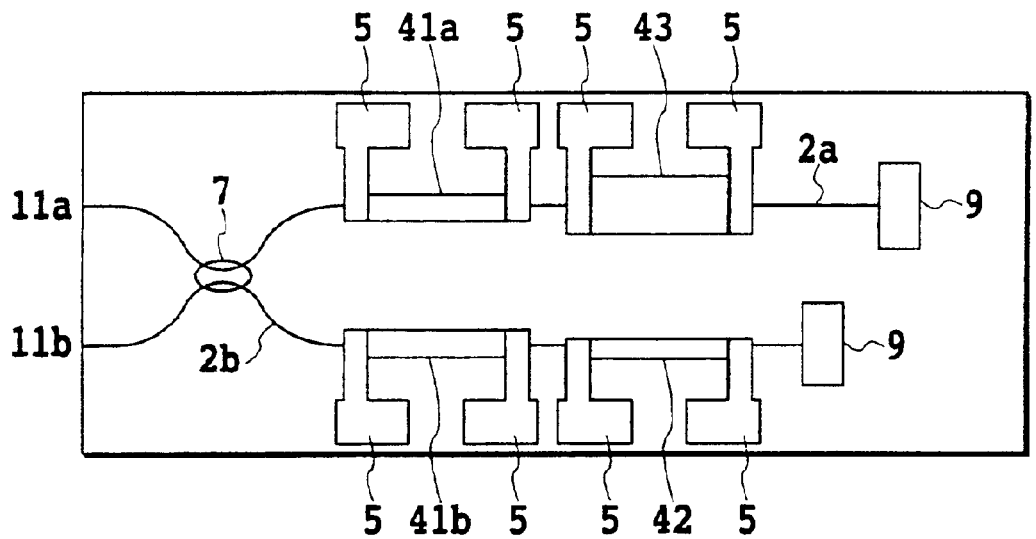
FIG. 8C is a plane view showing a Fabry-Perot interferometer as a sixth embodiment in accordance with the present invention.

FIG. 8C shows an example of a Fabry-Perot interferometer (round-trip interferometer) that provides the waveguide with a desired round-trip optical path length (resonance length), and comprises half mirrors 10 with the reflectivity of about 99%. The reference numerals 11 and 12 each designate an input/output port.

Figure 8D:
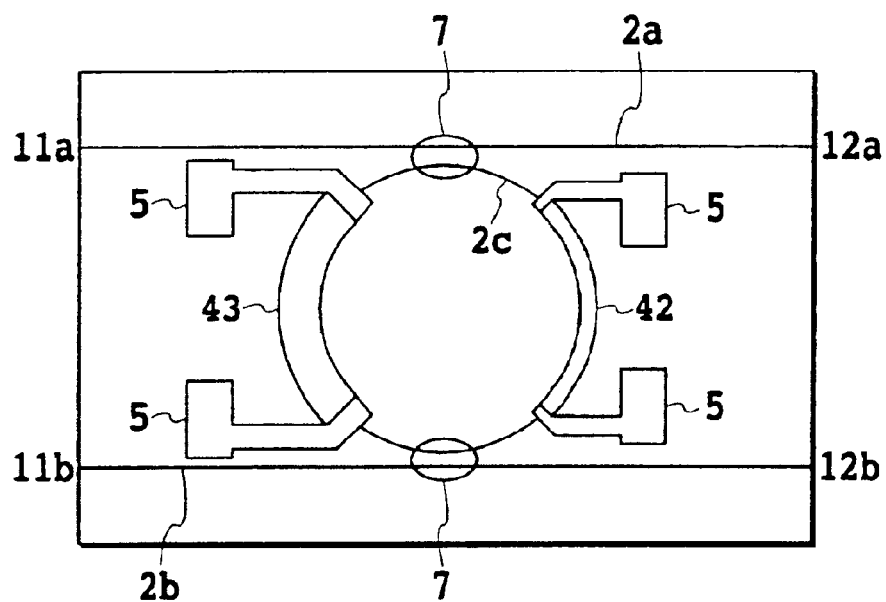
FIG. 8D is a plane view showing a ring resonance filter as a seventh embodiment in accordance with the present invention.

FIG. 8D shows an example of a ring resonance filter that implements a desired optical path length (resonance length) by a ring circuit 2c.

All the foregoing interferometers and filters implement a desired wavelength (frequency) transmission characteristics by establishing the optical path length difference or resonance length at a desired length $\Delta L$ (=effective refractive index ×waveguide length difference). However, since the effective refractive index of the waveguide is slightly higher in the transverse magnetic polarization mode than in the transverse electric polarization mode as described before in the embodiment 1, the optical path length difference and the resonance length are longer in the transverse magnetic polarization mode than in the transverse electric polarization mode.

These interferometers are characterized by exhibiting nearly the same wavelength characteristics in the neighborhood of the target wavelength λ even at the optical path length difference or the resonance length of $\Delta L_1 = \Delta L$ or $\Delta L_2 = \Delta L + m \cdot \lambda$, where m is an integer. Accordingly, if the optical path length difference between the transverse magnetic polarization mode and the transverse electric polarization mode can be adjusted to m·λ, the polarization dependency of the wavelength transmission characteristics is eliminated apparently. Thus, it is enough to adjust the optical path length difference between the transverse magnetic polarization mode and the transverse electric polarization mode to m·λ by the method of the foregoing embodiments, and to adjust the ΔL in the transverse electric polarization mode (or the transverse magnetic polarization mode) to a desired value. In this case, the value m is preferably set as close to zero as possible because the wavelength region that exhibits nearly the same characteristics becomes narrower with an increase in |m| in each polarization.

In practice, desired characteristics were achieved in which the polarization dependency of the wavelength transmission characteristics were eliminated apparently by the adjustment in these interferometers.

In the foregoing embodiments, the present invention is applied to rather simple optical circuits. However, the present invention is not limited to these circuits. For example, it is obvious that the present invention is applicable to a lattice type filter with a plurality of Mach-Zehnder interferometers connected in cascade, and to an arrayed waveguide grating, one of multiple beam interferometers.

The foregoing embodiments utilize the difference in the width of the local annealing regions as a means for implementing the two or more types of local annealing with different stress distribution. However, a method of bringing about the different stress portions is not limited to this method.

For example, the transverse electric polarization mode and the transverse magnetic polarization mode can be controlled independently by partially varying the over-cladding depth as $d_1$ and $d_2$ with maintaining the width w at a fixed value as shown in FIGS. 9A–9C. This is because the polarization characteristic is determined not only by the width w of the local annealing(heating) region, but also by the distance d from the top surface of the over-cladding to the core center. The independent control was confirmed by a device actually fabricated. In FIGS. 9A–9C, the reference numeral 21 designates a pit for trimming the depth of the cladding.

Alternatively, the transverse electric polarization mode and the transverse magnetic polarization mode can be controlled independently as in the foregoing embodiments by the following methods because they can bring about the polarization dependency in the effective refractive index change.

Figure 10A:
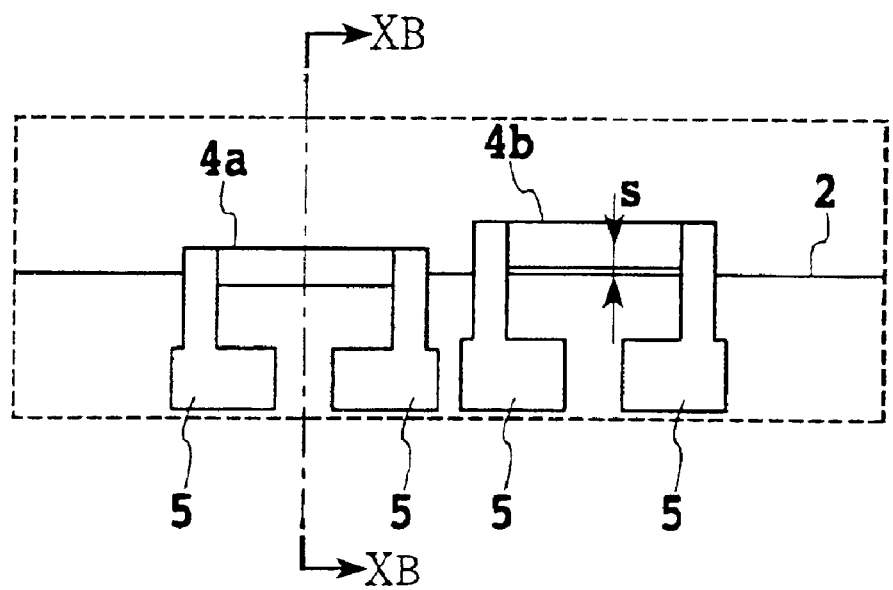
FIG. 10A is a plane view showing a variation of the basic configuration in accordance with the present invention.
Figure 10B:
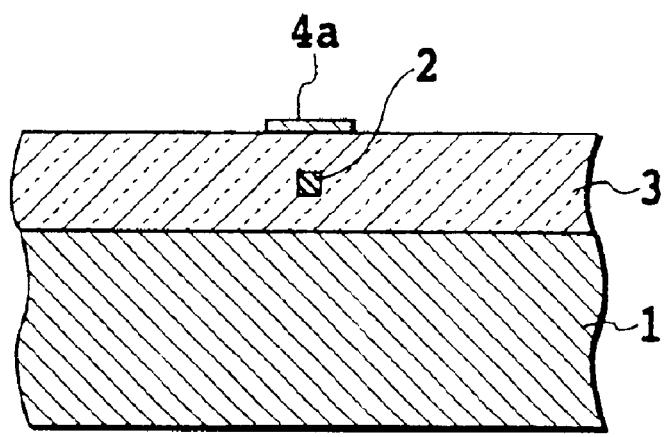
FIG. 10B is a cross-sectional view taken along the line XB—XB of FIG. 10A showing the variation of the basic configuration in accordance with the present invention.
Figure 11A:
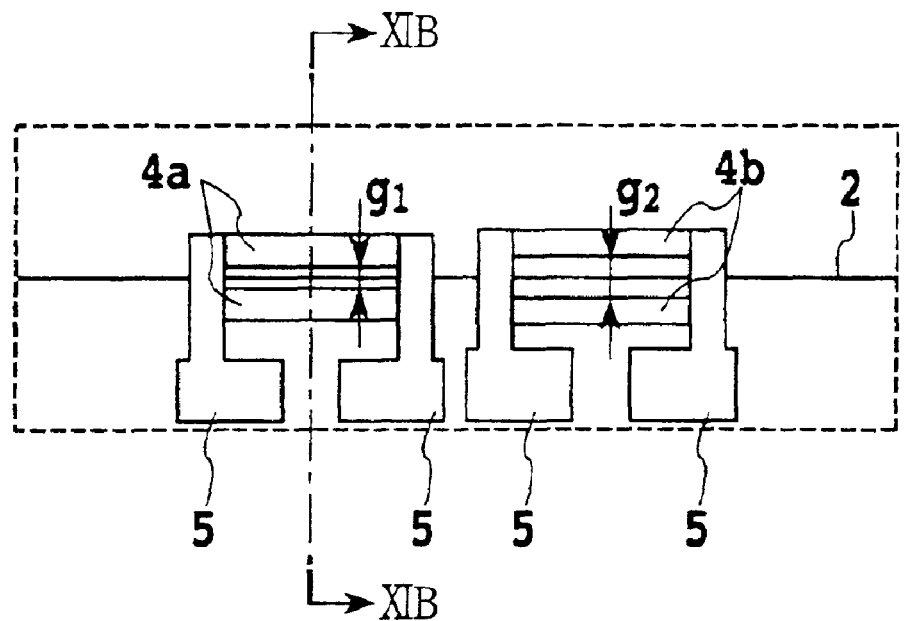
FIG. 11A is a plane view showing a variation of the basic configuration in accordance with the present invention.
Figure 11B:
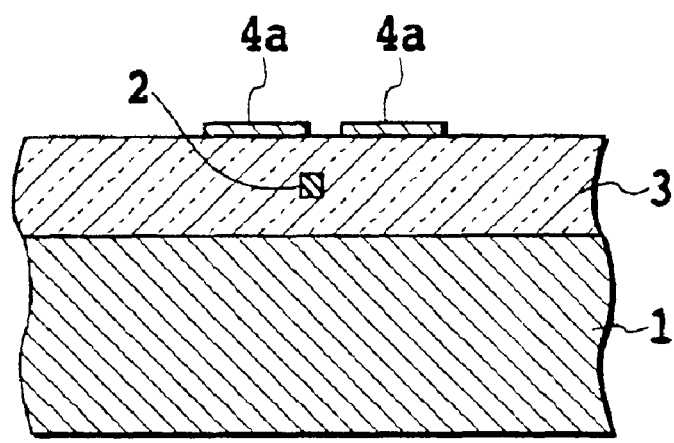
FIG. 11B is a cross-sectional view taken along the line XIB—XIB of FIG. 11A showing the variation of the basic configuration in accordance with the present invention.
Figure 12A:
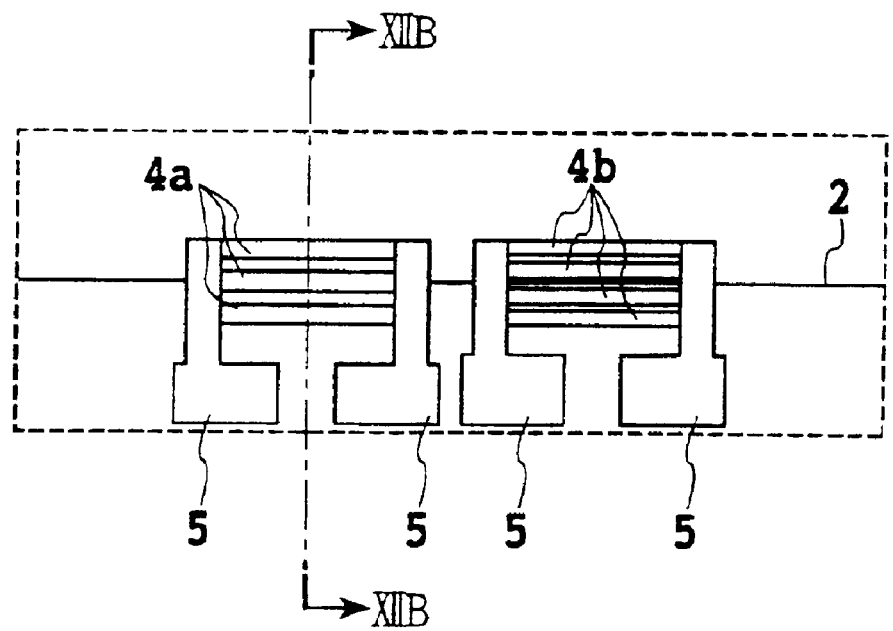
FIG. 12A is a plane view showing a variation of the basic configuration in accordance with the present invention.
Figure 12B:
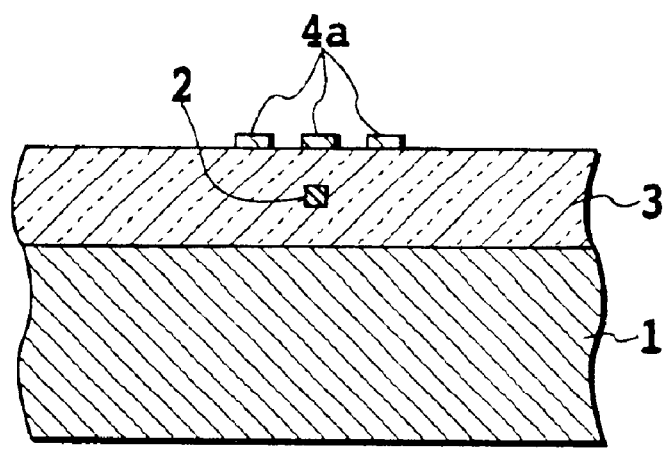
FIG. 12B is a cross-sectional view taken along the line XIIB—XIIB of FIG. 12A showing the variation of the basic configuration in accordance with the present invention.
Figure 13A:
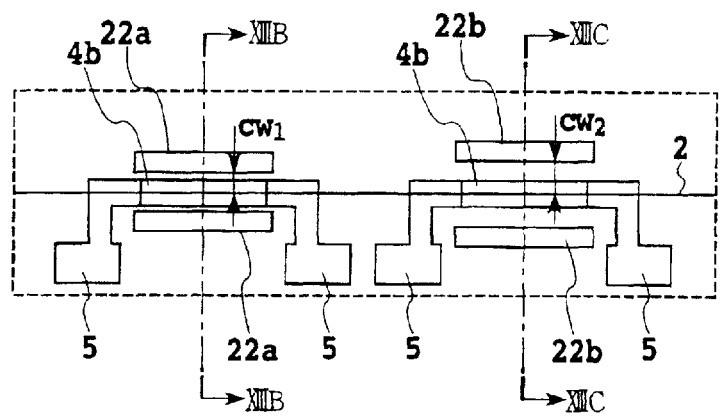
FIG. 13A is a plane view showing a variation of the basic configuration in accordance with the present invention.
Figure 13B:
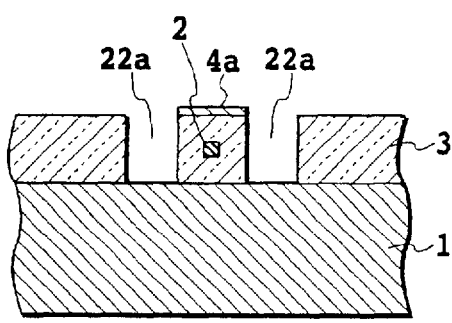
FIG. 13B is a cross-sectional view taken along the line XIIIB—XIIIB of FIG. 13A showing the variation of the basic configuration in accordance with the present invention.
Figure 13C:
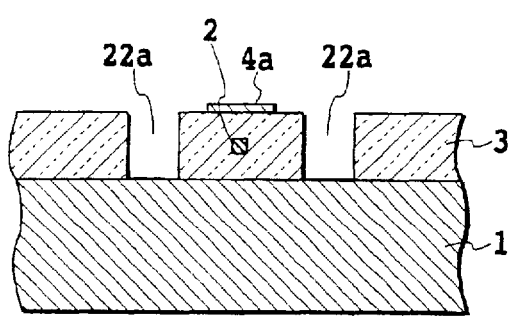
FIG. 13C is a cross-sectional view taken along the line XIIIC—XIIIC of FIG. 13A showing the variation of the basic configuration in accordance with the present invention.

A first structure: as shown in FIGS. 10A and 10B, the local annealing region is displaced from the position immediately above the waveguide (the thin film heater 4a is located immediately above the waveguide, and the thin film heater 4b is displaced from the waveguide by an amount s). A second structure: as shown in FIGS. 11A and 11B, the local annealing regions are provided with slits of different widths $g_1$ and $g_2$. A third structure: as shown in FIGS. 12A and 12B, the local annealing regions are divided into a plurality of stripes with different density (the thin film heater 4a has a low density and the thin film heater 4a has a high density). A fourth structure: as shown in FIGS. 13A–13C, trench structures (stress distribution trimming grooves 22a and 22b) are provided by removing the cladding from around the local annealing regions with varying the position and depth of the grooves (the position $CW_1$ of the stress distribution trimming groove 22a is close to the thin film heater 4a, and the position $CW_2$ of the stress distribution trimming groove 22b is distant from the thin film heater 4b).

Furthermore, although the thin film heaters formed on the cladding are used as the local annealing (heating) means, this is not essential. For example, a method of locally annealing (heating) the cladding by irradiating a $CO_2$ laser beam can achieve the same effect.

[EMBODIMENT 8: Polarization Independent Optical Switch]

Figure 14A:
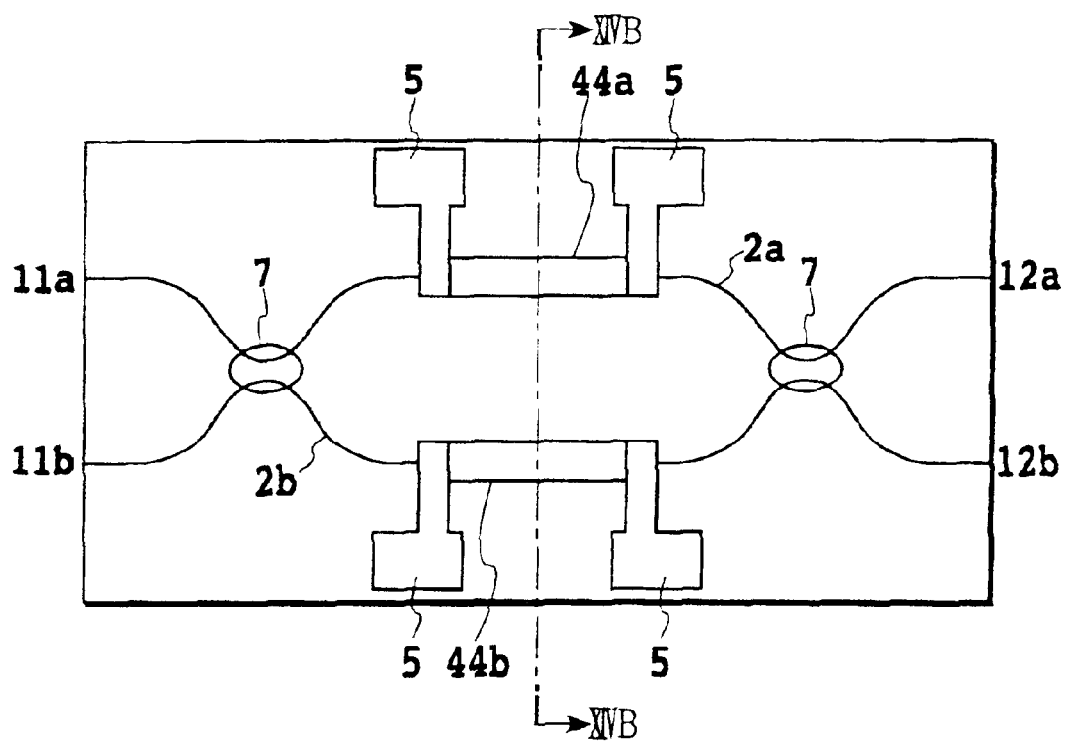
FIG. 14A is a plane view showing a polarization independent optical switch in accordance with the present invention.
Figure 14B:
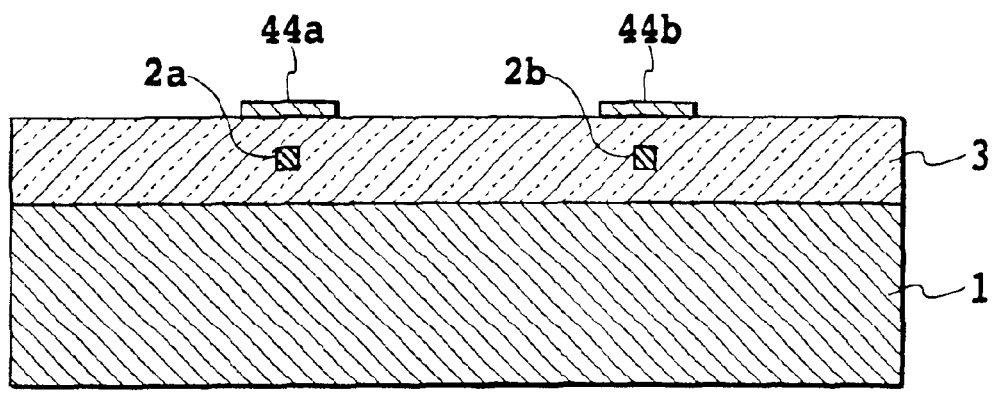
FIG. 14B is a cross-sectional view taken along the line XIVB—XIVB of FIG. 14A showing the polarization independent optical switch in accordance with the present invention.

FIGS. 14A and 14B show an optical switch used as an interferometer that can obviate the need for controlling the effective refractive index independently for the transverse electric polarization mode and transverse magnetic polarization mode, and that can achieve desired optical characteristics by trimming it in a polarization independent manner. FIG. 14A is a plane view, and FIG. 14B is a cross-sectional view taken along the line XIVB—XIVB of FIG. 14A. Although the configuration of the optical switch is similar to the PBS of the third embodiment, it differs in comprising two thin film heaters 44a and 44b with the same structure as a local annealing means.

The thin film heaters 44a and 44b, each of which is 30 μm wide ($\approx W_o$: about twice the distance from the top surface of the over-cladding to the core center) and 5 mm long, are each disposed on one of the two waveguide arms that are spaced 200 μm and have the arm length of about 15 mm each.

The optical switch of the present embodiment is formed into a module by the same method as that of the first embodiment. The input/output ports 11a, 11b, 12a and 12b are each connected to a single mode fiber, and the thin film heaters 44a and 44b are each connected to feeding leads via feeding electrodes and electrode pads 5.

Since the optical path length difference between the waveguide arms is designed to be zero in both the transverse electric polarization mode and the transverse magnetic polarization mode in the optical switch, the light launched into the input port, the input/output port 11b, is guided to the cross port, the input/output port 12a (OFF state).

When the waveguide arms are provided with a λ/2 phase difference by the thermo-optic effect caused by supplying current to the thin film heaters 44a and 44b, the light launched into the input port, the input/output ports 11b, is guided to the bar port, the input/output port 12b, thereby operating as a switch (ON state).

Actual measurement of the optical path length deviation by using the thin film heaters 44a and 44b as thermo-optic phase shifters shows that the optical path length difference $\Delta L_{(o)} = -0.1 \cdot \lambda/2$. Therefore, the refractive index change required by the 5 mm long local annealing regions is $1.6 \times 10^{-5}$.

To achieve the refractive index change, the local annealing was performed by supplying the thin film heater 44b with the power of 6W several times, each for a few seconds, with observing the changes of the ΔL each time.

As a result, supplying the power for the total of 14 second enabled the condition ΔL=0 to be established permanently in both the transverse electric polarization mode and transverse magnetic polarization mode. Thus, the satisfactory characteristics were achieved with the insertion loss of about 1 dB and the polarization extinction ratio of about 30 dB without applying fine adjusting bias power in the OFF state in each polarization state.

In this trimming, although the local annealing was carried out by dividing the annealing time and by controlling the total annealing (heating) time according to the changes in the ΔL for accuracy, the annealing can be performed at one time when some error is accepted.

Furthermore, although the thin film heaters 20 formed on the cladding are used as the local annealing (heating) means, this is not essential. For example, a method of locally annealing (heating) the cladding by irradiating a $CO_2$ laser beam can achieve a similar effect.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An interferometer using an optical waveguide, which is formed by embedding a core that has a refractive index higher than that of a cladding into the cladding on a substrate, said interferometer comprising:
    at least two types of annealing regions that are provided near the optical waveguide, wherein
    an optical path length of said optical waveguide is trimmed by permanently changing an effective refractive index of said optical waveguide by applying annealing to said annealing regions.

2. The interferometer as claimed in claim 1, wherein said annealing regions differ in their width.

3. The interferometer as claimed in claim 1, wherein each of said annealing regions is disposed at a distance from said optical waveguide, and each distance to said optical waveguide is different.

4. The interferometer as claimed in claim 1, wherein at least one of said annealing regions is split by one or more slits.

5. The interferometer as claimed in claim 1, wherein at least one of said annealing regions is accompanied with one or more trenches formed by partially removing the cladding alone said optical waveguide.

6. The interferometer as claimed in claim 1, wherein at least one of said annealing regions is provided with a thin film heater.

7. The interferometer as claimed in claim 1, further comprising fixed delay means for providing delay dependent on a polarization state.

8. The interferometer as claimed in claim 1, wherein said interferometer comprises at least one optical coupler and a plurality of optical waveguides connected to said optical coupler.

9. The interferometer as claimed in claim 8, wherein said interferometer comprises two 2×2 optical couplers and two optical waveguides connecting said optical couplers, wherein
    optical path length difference (delay difference) between said two optical waveguides is trimmed by local annealing such that the optical path length difference is an odd multiple of $\lambda/2$ for a transverse electric polarization mode and an even multiple of $\lambda/2$ for a transverse magnetic polarization mode, where $\lambda$ is a wavelength, or that it is an even multiple of $\lambda/2$ for the transverse electric polarization mode and an odd multiple of $\lambda/2$ for the transverse magnetic polarization mode.

10. The interferometer as claimed in claim 9, wherein at least one of said two optical waveguides connecting said two 2×2 optical couplers comprises polarization dependent fixed delay means.

11. The interferometer as claimed in claim 2, wherein at least one of said annealing regions has a width equal to or greater than 2.6 times a distance d from a core center to a top surface of the cladding, or at least one of said annealing regions has a width equal to or less than 1.4 times the distance from the core center to the top surface of the cladding.

12. The interferometer as claimed in claim 2, further comprising fixed delay means for providing delay dependent on a polarization state.

13. The interferometer as claimed in claim 2, wherein said interferometer comprises at least one optical coupler and a plurality of optical waveguides connected to said optical coupler.

14. The interferometer as claimed in claim 6, further comprising fixed delay means for providing delay dependent on a polarization state.

15. The interferometer as claimed in claim 6, wherein said interferometer comprises at least one optical coupler and a plurality of optical waveguides connected to said optical coupler.

16. The interferometer as claimed in claim 6, wherein said annealing regions differ in their width.

17. The interferometer as claimed in claim 6, wherein at least one of said annealing regions is accompanied with one or more trenches formed by partially removing the cladding along said optical waveguide.

18. A fabrication method of an interferometer comprising the steps of:
    forming an optical waveguide having a core that has a refractive index higher than that of a cladding and is embedded into the cladding on a substrate;
    forming at least two types of thin film heaters near said optical waveguide; and
    trimming an optical path length of said optical waveguide by permanently changing an effective refractive index of said optical waveguide by locally annealing a neighborhood of said optical waveguide by said thin film heaters.

19. An interferometer using an optical waveguide, which is formed by embedding a core that has a refractive index higher than that of a cladding into the cladding on a substrate, said interferometer comprising:
    one type of annealing region that has a width from 1.4 to 2.6 times a distance from the optical waveguide to a top surface of said cladding in a neighborhood of said optical waveguide, wherein
    an optical path length of said optical waveguide is trimmed by permanently changing an effective refractive index of said optical waveguide by applying annealing to said annealing region.

20. A fabrication method of an interferometer comprising the steps of:
    forming an optical waveguide including a core that has a refractive index higher than that of a cladding and is embedded into the cladding on a substrate;
    forming one type of thin film heater that has a width from 1.4 to 2.6 times a distance from the optical waveguide to a top surface of said cladding in a neighborhood of said optical waveguide; and
    trimming an optical path length of said optical waveguide by permanently changing an effective refractive index of said optical waveguide by applying annealing to said thin film heater.

* * * * *

UNITED STATES PATENT AND TRADEMARK OFFICE
CERTIFICATE OF CORRECTION

PATENT NO. : 6,823,094 B2 Page 1 of 1
APPLICATION NO. : 10/054618
DATED : November 23, 2004
INVENTOR(S) : Goh et al.

It is certified that error appears in the above-identified patent and that said Letters Patent is hereby corrected as shown below:

*<u>On Title Page 2, col. 2 line 7 (last citation): J. Canning et al;</u>*

Delete "Birefingence" and insert -- Birefringence --;

Col. 17, line 36, delete "alone" and insert -- along --.

Signed and Sealed this

Tenth Day of April, 2007

JON W. DUDAS
*Director of the United States Patent and Trademark Office*